United States Patent
Ma

(10) Patent No.: US 11,306,477 B2
(45) Date of Patent: Apr. 19, 2022

(54) STREAMLINED BODY AND STREAMLINED APPARATUS FOR SUPPRESSING VIBRATIONS OF ENCLOSURE AND METHOD FOR HOISTING TOWER

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 686 days.

(21) Appl. No.: 16/304,684

(22) PCT Filed: Feb. 26, 2018

(86) PCT No.: PCT/CN2018/077198
§ 371 (c)(1),
(2) Date: Nov. 26, 2018

(87) PCT Pub. No.: WO2019/047486
PCT Pub. Date: Mar. 14, 2019

(65) Prior Publication Data
US 2021/0222428 A1    Jul. 22, 2021

(30) Foreign Application Priority Data

Sep. 11, 2017  (CN) .......................... 201710814357.7

(51) Int. Cl.
*E04B 1/98*    (2006.01)
*F03D 80/00*   (2016.01)
(Continued)

(52) U.S. Cl.
CPC ............. *E04B 1/98* (2013.01); *E04H 12/342* (2013.01); *F03D 13/20* (2016.05); *F03D 80/00* (2016.05);
(Continued)

(58) Field of Classification Search
CPC ....... E04B 1/98; E04H 12/342; E04H 12/344; F03D 7/0296; F03D 13/20; F03D 80/00;
(Continued)

(56) References Cited

U.S. PATENT DOCUMENTS 1,408,868 A * 3/1922 Dutcher ................. B63B 15/00
                                                        114/90
3,352,118 A * 11/1967 Burkhardt ........... E02B 17/0017
                                                        405/211

(Continued)

FOREIGN PATENT DOCUMENTS

CN    201507543 U    6/2010
CN    103469830 A    12/2013
(Continued)

OTHER PUBLICATIONS

Supplementary European Search Report issued in corresponding European Application No. 18804221.2, dated Jul. 16, 2019, 8 pages.
(Continued)

*Primary Examiner* — Jessie T Fonseca
(74) *Attorney, Agent, or Firm* — Bayes PLLC

(57) ABSTRACT

A streamlined body, apparatus for suppressing vibrations of an enclosure, and a method for hoisting a tower are provided. The streamlined body surrounds the enclosure, and the streamlined body has a streamlined leading edge. The leading edge can faces towards the upwind incoming flow, to allow the upwind incoming flow to form a positive attack angle or a negative attack angle. In this solution, the enclosure is surrounded by the streamlined body, and when the
(Continued)

upwind incoming flow flows around the enclosure to come into contact with the streamlined body, the aerodynamic configuration is changed, and the aerodynamic coefficient becomes small, thus the vibrations are reduced. Moreover, the direction and path of the airflow are changed, which disrupts the correlation of the upwind incoming flow near the streamlined body, and disrupts the consistence of frequencies of vortex shedding of the airflow at the streamlined body and other positions.

23 Claims, 24 Drawing Sheets

(51) Int. Cl.
*F03D 13/20* (2016.01)
*E04H 12/34* (2006.01)

(52) U.S. Cl.
CPC ... *F05B 2240/912* (2013.01); *F05B 2260/964* (2013.01)

(58) Field of Classification Search
CPC ......... F05B 2240/912; F05B 2260/964; Y02E 10/72; Y02E 10/728
See application file for complete search history.

(56) References Cited

U.S. PATENT DOCUMENTS

| | | | | |
|---|---|---|---|---|
| 4,398,487 A | * | 8/1983 | Ortloff | B63B 1/32 114/243 |
| 4,474,129 A | * | 10/1984 | Watkins | E21B 17/01 114/243 |
| 4,657,116 A | * | 4/1987 | Gardner | F16F 15/00 114/312 |
| 5,410,979 A | * | 5/1995 | Allen | B63B 21/502 114/243 |
| 10,344,785 B1 | * | 7/2019 | Allen | F15D 1/003 |
| 2015/0361958 A1 | | 12/2015 | Wood | |
| 2017/0219045 A1 | * | 8/2017 | Glanzner | F16F 15/035 |
| 2020/0200148 A1 | * | 6/2020 | Garduno Estebanez | F03D 13/20 |
| 2020/0240102 A1 | * | 7/2020 | Bartminn | E02D 27/50 |

FOREIGN PATENT DOCUMENTS

| | | |
|---|---|---|
| CN | 104696165 A | 6/2015 |
| CN | 107387334 A | 11/2017 |
| CN | 107461304 A | 12/2017 |
| CN | 107620680 A | 1/2018 |
| DE | 102008008760 A1 | 8/2009 |
| EP | 2436924 A1 | 4/2012 |
| GB | 2484962 A | 5/2012 |
| JP | 2007198354 A | 8/2007 |
| KR | 20120099891 A | 9/2012 |
| WO | 2014205348 A1 | 12/2014 |

OTHER PUBLICATIONS

International Search Report and Written Opinion in corresponding PCT Application No. PCT/CN2018/077198, dated Jun. 7, 2018, 12 pages.

\* cited by examiner

STREAMLINED BODY AND STREAMLINED APPARATUS FOR SUPPRESSING VIBRATIONS OF ENCLOSURE AND METHOD FOR HOISTING TOWER

RELATED APPLICATIONS

This application is the national phase of International Application No. CN2018/077198, filed on Feb. 26, 2018, which claims the priority to Chinese Patent Application No. 201710814357.7, titled "STREAMLINED BODY AND STREAMLINED APPARATUS FOR SUPPRESSING VIBRATIONS OF ENCLOSURE AND METHOD FOR HOISTING TOWER", filed with the State Intellectual Property Office of People's Republic of China on Sep. 11, 2017, the entire disclosures of the above-identified applications are incorporated herein by reference.

FIELD

The present application relates to the field of wind power technology, and in particular to a streamlined body and a streamlined apparatus for suppressing vibrations of an enclosure and a method for hoisting a tower.

BACKGROUND

Reference is made to FIG. 1-1, which is a schematic view showing the composition of wind power generation equipment.

The base of the wind power generation equipment is a tower 10, which carries and encloses the whole machine. Taking a tower 10 having a circular section as an example, the tower 10 may be a steel tower or a steel tower in combination with a concrete tower. The tower 10 carries a nacelle 30, a generator, and an impeller 20 of the wind power generation equipment. Tasks of acquiring wind energy and converting wind energy into electric energy are performed by a wind power generator set composed of the tower 10, the impeller 20, the nacelle 30 and the generator. The converted electric energy is transmitted through a power transmission cable 40 or a power delivery busbar. The power transmission cable 40 shown in the figure is led out from the nacelle 30 and is limited by a cable retaining ring which is at the top of the tower 10 and is fixed to a cable retainer fixing plate 50, and the power transmission cable 40 then passes a saddle bracket 60 and is suspended along an inner wall of the tower 10 to a converter cabinet 70. A tower door 80 is further provided at a lower end of the tower 10.

The electric energy obtained by the conversion is controlled by a switch cabinet of the wind power generator set and is transported by means of the power transmission cable 40 or the power delivery busbar to a converter (in the converter cabinet 70) performing the electric power conversion task, and then is subjected to treatment by the converter, thus electric energy meeting the requirements of power grid access rule can be obtained. Therefore, the tower 10 of the wind power generation equipment can be regarded as a tower pole for wind power generation, and mainly plays a supporting role in the wind power generation equipment.

Moreover, the tower 10 bears wind loading of structures generated by the nacelle 30, the impeller 20 and the generator, or the downwind vibrations and crosswind vibrations resulted from the wind loading of structures, i.e., wind-induced structure vibration issues.

Reference is made to FIG. 1-2, which are a schematic views of the tower hoisted in segments.

The tower 10 is generally installed in segments currently, as shown in FIG. 1-2, the tower segments are sequentially, from the bottom to the top, a first tower segment 11, a second tower segment 12, a third tower segment 13, a fourth tower segment 14 and a fifth tower segment 15. In the process of installing the wind power generation equipment, the first tower segment 11 is installed on a ground foundation 90 of the tower 10 first, and then other tower segments are hoisted segment by segment, and after the tower segments are connected one another, the top of the tower 10 (the fifth tower segment 15 in FIG. 1-2) is connected to a yaw system of the nacelle 30, and the nacelle 30 is butt-jointed with the power generator, and the power generator (or a gear box) is then butt-jointed with the impeller 20.

The specific hoisting process is as follows.

Before hoisting the tower 10, a foundation annulus of the ground foundation 90 connected to the first tower segment 11 is cleaned firstly, and multiple bolts (such as 120 bolts) are placed at an inner ring of the foundation annulus with oil being applied on a threaded portion of each of the bolts, and meanwhile, a control cabinet of the wind power generation equipment is hoisted within the foundation annulus.

A hoisting appliance is mounted at an upper end of the first tower segment 11, here the task of hoisting the upper end of the first tower segment 11 is performed by a main hoist, and at the same time, a hoisting appliance is also mounted at a lower end of the first tower segment 11, and the task of hoisting the lower end of the first tower segment at is performed by an auxiliary hoist for the tower. The two hoists hoist at the same time. When the altitude of the first tower segment 11 is greater than a maximum diameter of the first tower segment 11, the main hoist hoists the upper end of the first tower segment 11 at that altitude, and the auxiliary hoist stops working. When the first tower segment 11 is hoisted to be perpendicular to its position on the ground, the auxiliary hoist is removed, and the hoisting appliance at the lower end of the first tower segment 11 is removed.

After a flange surface of the first tower segment 11 is connected, the bolts are passed from bottom to top, and nuts are installed and are tightened by means of an electric wrench. The nuts are tightened by at least 3 times (till the hoisting procedure of the entire wind power generation equipment is finished, the tower connecting nuts are then tightened by means of a torque wrench to a required torque value).

The hoisting processes of the rest tower segments are the same as that of the first tower segment 11, and after the hoisting of the uppermost tower segment finishes, it is prepared to hoist the nacelle.

The above installation procedures of butt joint and connection are all carried out under conditions where local winds in a small regional environment of a wind farm are unpredictable. Therefore, in the process of hoisting and installation, gusts of varying scales or continuous light wind are often encountered. As described above, these gusts or continuous wind may induce vibrations of the tower, disrupt the stability of the enclosure, and endanger the on-site personnel and equipment, and delay the installation period. For example, after the fourth tower segment 14 is hoisted, the fourth tower segment 14 may vibrate, such that the fifth tower segment 15 cannot be aligned; and even the fastened bolts may be broken under the action of vibrations, thereby compromising security.

At present, the project safety requirements for the hoisting process of the wind power industry clearly state that hoisting of the blade group is prohibited when the wind speed is greater than 6 m/s; and hoisting of the nacelle is strictly prohibited when the wind speed is greater than 8 m/s, and hoisting of the tower is strictly prohibited when the wind speed is greater than 10 m/s. Accordingly, the on-site hoisting progress and installation period are obviously limited by the wind conditions in the local region. For the construction of wind farms at high-altitude and high-mountain regions, the project duration is even more apt to be adversely affected.

Reference is made to FIGS. 2 to 3-6, FIG. 2 is a schematic view showing the structure of a tower having a certain vibration suppression function; FIGS. 3-1 to 3-6 are schematic views showing the relationship between vortex shedding from a cylinder (bypass flow detachment) and six intervals of Reynolds number. The six intervals of the Reynolds number (Re) are respectively Re<5, 5<Re<40, 40<Re<150, 150<Re<$3\times10^5$, $3\times10^5$<Re<$3\times10^6$, and Re>$3\times10^6$ from FIGS. 3-1 to 3-6.

According to different patterns of flowing of airflow around object structures, the structures are divided into a bluff body and a streamlined body such as an aircraft wing or a sail.

When Re<5, the fluid flows while attaching to the entire surface of the cylinder, i.e., the fluid flows without being detached from the surface of the cylinder.

When 5<Re<40, the flowing is still symmetrical, but detachment occurs in the flowing, and two symmetrically arranged stable vortexes are formed on a leeward side, and the vortexes are warped outwards as the Reynolds number increases, resulting in malformation of the vortexes.

When 40<Re<150, starting from the Reynolds number Re=40, the vortexes will alternately shed from a rear side of the surface of the cylinder and flow into the fluid near the back of the cylinder to form a shear layer. The unstable shear layer soon rolls up into vortexes and flows downstream, forming the Karman vortex street, i.e., the vortex-induced vibration. The vortex shedding here is regular and periodic.

When 150<Re<300, it is a transition period from laminar flow to turbulent flow, here periodic vortex shedding is covered by irregular turbulent flow.

When 300<Re<$3\times10^5$, it is referred to as a subcritical region. The cylinder wake is mainly presented as a turbulent wake after detachment. The vortex shedding begins to be irregular, and the period of vortex shedding frequency can be roughly defined, however, the disturbing force in vortex shedding will no longer be symmetrical, but be random.

When $3\times10^5$<Re<$3\times10^6$, it is referred to as a supercritical region. The vortex shedding point moves backwards, and the vortex street cannot be identified, and becomes a completely non-periodic vortex.

When $3\times10^6$<Re, it is referred to as a transcritical region, the wake at the rear side of the cylinder is very disordered, however, showing a regular vortex shedding.

When a uniform airflow flows by (sweeps horizontally, flows around) a bluff body (cylindrical body), the periodic vortex shedding generated at the back of the section of the cylinder may produce a periodically changed action force, i.e., vortex-induced force, on a construction (the contact surface of the tower). A lower end of the tower construction around which the airflow flows and the underground foundation constitute a single free end vibration system (i.e., an upper end of the tower is submerged in the airflow, and a lowermost end of the tower is fixed on the ground foundation). When the vortex shedding frequency consists with a certain order of natural frequency of a tower construction, the periodic vortex-induced force (unbalanced force) subjected by the tower surface will cause a response of vortex-induced vibration of the tower system structure.

The condition that the vortex shedding frequency is equal to the natural frequency of the tower of the structural system and its foundation vibration system can be met only at a certain wind speed. However, the tower and its foundation vibration system at the natural frequency will have a certain feedback effect on the vortex shedding, to allow the frequency of the vortex shedding to be "captured" by the tower and its foundation vibration system in a certain wind speed range, to allow the frequency of the vortex shedding not to be changed as the wind speed changes in this wind speed range, and this phenomenon is referred to as locking, and the locking will extend the wind speed range in which the tower structure is resonated due to being induced by vortexes.

The tower height of modern large-scale megawatt wind power generator sets can reach 60 m to 100 m. Main components such as a main frame, a sub-frame, a hub and blades (i.e., the impeller 20) are mounted at the top of the tower 10. When the wind power generator set is in operation, in addition to the gravity generated by the parts at the top of the tower 10 and the dynamic load generated by the rotation of the wind wheel, the tower 10 is subjected to the action of the natural wind, including two modes of action, i.e., the action in downwind direction and the action in crosswind direction. When the wind blows the impeller to rotate, it will apply bending moments and forces onto the tower. The bending moments and forces generated in downwind direction are the main reasons for the damage of the tower 10. The vortexes generated when the wind bypasses the tower 10 may also cause lateral vibrations that may cause the tower 10 to be resonated and damaged accordingly.

When the wind blows over the tower 10, pairs of anti-symmetrical vortexes arranged alternately and rotating in opposite directions, i.e., Karman vortexes, are generated at left and right sides of the wake. The vortexes shed from the tower 10 at a certain frequency, to cause lateral vibration perpendicular to the wind direction, also referred to as wind-induced lateral vibration, i.e., vortex-induced vibration, to occur in the tower 10. When the shedding frequency of the vortexes is close to the natural frequency of the tower, the tower 10 is apt to be resonated and therefore be damaged.

In FIG. 3, a helix line 10a (or a helix plate) is wound around an outer wall of the tower 10, to suppress vortex shedding occurred on the surface of the tower 10. The helix line 10a (or the helix plate) has different lateral vibration suppression effects when arranged at different pitches. The increase of the height of the helix line 10a facilitates the breaking of the periodicity of the vortex street shedding. Vortex street generation and shedding are more irregular, which facilitates the suppression of vortex-induced vibrations. Moreover, the noise and resistance generated behind and in front of the tower are also gradually increased, and the amplitude of a pitching vibration along the wind direction may be increased.

The above technical solution has the following technical issues.

The coverage rate of the helix line 10a (or the helix plate) on the tower surface will affect the lateral vibration suppression effect. When the coverage rate reaches (or exceeds) 50%, the effect of suppressing lateral vibrations reaches the best. However, in this case, the serious adverse effects of the wind-induced noise caused by the helix line 10a (or the helix plate) and the airflow on the organisms in the natural environment is not permitted by the ecological regulations.

In addition, the wind speed of the airflow will change, and if the helix line 10a (or the helix plate) is machined to have its feature parameters (pitch of screws, height) changed according to the change of the wind speed of the airflow, the corresponding manufacturing cost and maintenance cost will be increased significantly.

In view of this, an urgent technical issue to be addressed by the person skilled in the art is to improve the situation in which the installation of the wind power generation equipment is restricted by regional wind conditions.

SUMMARY

In order to address the above technical issues, a streamlined body and a streamlined apparatus for suppressing vibrations of an enclosure and a method for hoisting a tower are provided according to the present application. The method can utilize the upwind incoming flow itself to suppress vibrations of the enclosure and mitigate the situation that the installation of the enclosure is restricted by wind conditions.

A streamlined body for suppressing vibrations of an enclosure is provided according to an embodiment of the present application. The streamlined body is capable of surrounding the enclosure and has a streamlined leading edge. The leading edge is capable of facing towards an incoming flow at an upwind side, which allows the upwind incoming flow to form a positive attack angle and/or a negative attack angle.

Optionally, the streamlined body is a streamlined body capable of floating under the action of the upwind incoming flow.

Optionally, the streamlined body has an annular shape, and a central through hole of the streamlined body has a lateral dimension, which meets the following condition: when the streamlined body is at the top of the enclosure, a gap between an inner wall of the central through hole of the streamlined body and the enclosure has a predetermined size for disrupting the floating force generated by the upwind incoming flow, achieving self-balancing.

Optionally, the streamlined body has a closed annular shape.

Optionally, the streamlined body further includes a tail portion opposite to the leading edge, and the distance from the leading edge to the enclosure is less than the distance from the tail portion to the enclosure.

Optionally, the streamlined body is gradually expanded toward two sides from the leading edge thereof, and then gradually contracted rearwards, and then gradually expanded to form the tail portion.

Optionally, an outer edge of the tail portion is cambered.

Optionally, an outer profile of the streamlined body is similar to a fish shape.

Optionally, the streamlined body has an annular shape and has an annular cavity, gas is filled inside the annular cavity, and the gas has a density less than the density of air.

Optionally, an inner side outer surface, facing towards the enclosure, the streamlined body is provided with multiple elastic bodies capable of squeezing the enclosure under the action of the upwind incoming flow, and a convergent-divergent flow channel of air flow is formed between the elastic bodies when the elastic bodies squeeze the enclosure.

Optionally, the streamlined body is provided with elastic spheres, and each of the elastic spheres has a portion exposed from the streamlined body to form the elastic body, and has another portion fixed in the streamlined body.

Optionally, the elastic spheres are distributed in entire circumferential and height directions of an inner side outer surface of the streamlined body; and the elastic spheres on a side facing towards the upwind incoming flow have a distribution density less than the distribution density of the elastic spheres at other positions.

Optionally, the streamlined body has an annular shape, and the central through hole thereof has a gradually decreased lateral dimension from bottom to top.

Optionally, the streamlined body has abutment surfaces, and forms a complete annular shape after the abutment surfaces are butt-jointed and locked.

Optionally, the streamlined body is made of a material having airtightness and wear resistance; the streamlined body is a symmetrical structure, and the symmetrical center line is a connection line that connects the middle of the leading edge to the middle of the tail portion.

A streamlined apparatus for suppressing vibrations of an enclosure is further provided according to an embodiment of the present application, which includes the streamlined body according to any one of the above aspects.

Optionally, the streamlined body further includes a tether, the tether has one end fixed to the enclosure or the ground and has another end connected to the streamlined body.

Optionally, at least one segment of the tether is an elastic segment;

and/or, each of the leading edge and the tail portion of the streamlined body is provided with a corresponding tether.

Optionally, the streamlined body has an annular shape and has an annular cavity, and gas is filled inside the cavity; and the streamlined apparatus further includes a recovery pipe and a gas collection device, the recovery pipe has one end connected to the streamlined body and has another end connected to the gas collection device, to recover the gas inside the streamlined body to the gas collection device.

Optionally, the gas collection device is arranged within a nacelle at the top of the enclosure.

Optionally, the streamlined body has abutment surfaces, and forms a complete annular shape after the abutment surfaces are butt-jointed and locked; a wireless electronic lock is further provided, and the abutment surfaces are locked by the wireless electronic lock; the streamlined apparatus further includes a remote controller for wirelessly controlling the wireless electronic lock.

Optionally, the nacelle is provided with a recovery port, and the streamlined body can be hoisted into the nacelle via the recovery port.

Optionally, the enclosure is a tower of a wind power generator set, a television tower or an anemometer tower.

A method for hoisting a tower is further provided according to an embodiment of the present application. The tower includes multiple tower segments, and the tower is hoisted in segments when being installed. The method for hoisting the tower includes surrounding a corresponding tower segment with the streamlined body in the streamlined apparatus according to any one of the above aspects in the process of hoisting.

Optionally, the method for hoisting the tower includes only when hoisting a tower segment corresponding to an upper part of the tower, surrounding the tower segment with the streamlined body.

Optionally, the method for hoisting the tower includes removing the streamlined body from the tower after the hoisting of the tower is finished, and the nacelle is installed.

In this solution, the streamlined body is surrounded on the tower, which can suppress vibrations, and the principle of which is analyzed as follows.

1. When the upwind incoming flow comes into contact with the streamlined body when flowing around the tower, the aerodynamic configuration is changed, and the aerodynamic coefficient C of the tower becomes small after the bypass flow of the tower becomes relatively streamlined. It can be appreciated as that the resistance is reduced, such that the amplitude A of the vortex-induced resonance can be reduced, and the vibrations can be reduced.

Further quantitative analysis can be performed. When the aerodynamic configuration becomes elliptical, the aerodynamic coefficient C can be reduced from the general 1.2 to about 0.6 or even smaller, which greatly reduces the resistance and reduces the vibrations. To understand in a visualized manner, when the upwind incoming flow horizontally sweeps over the tower, the aerodynamic configuration in contact with the outer surface of the tower is circular, and pertains to a bluff body, which requires the wind direction to be changed abruptly, and may cause a large unbalanced force. After the attack angle changes, the aerodynamic configuration is elliptical, the track of the fluid moving rearwards is elongated, and the wind direction changes slowly, thereby reducing the generation of the unbalanced force, and reducing vibrations.

2. After the upwind incoming flow flows over the stream line body, at the position corresponding to the streamlined body, the direction and path of the airflow are changed, which disrupts the correlation of the upwind incoming flow near the streamlined body, and disrupts the consistence of frequencies of vortex shedding of the airflow at the streamlined body and other positions, thus weakening their co-action, reducing or preventing the vortex-induced resonance response when bypass flow detachment occurs in the boundary layer at the outer surface of the tower, thereby preventing the vibrations induced by the vortexes at the tower.

When the above method is used to reduce the vortex-induced vibrations, compared with the helix line method in the background technology, the leading edge of the streamlined body is designed to be streamlined, which can reduce the resistance of the upwind incoming flow, and can reduce noise in itself, and meet the requirements of ecological regulations. Moreover, the streamlined body suppresses vibrations by causing the upwind incoming flow to generate an attack angle, thus even when the wind speed changes, the exertion of the vibration suppression function can be ensured. In addition, when the streamlined body is a floatable structure, it is also self-adaptive to the change of the wind speed, to float and down, stay at a higher position or a lower position, and play a corresponding role. Moreover, floating and down in a certain height region can disrupt the correlation between the upper airflow and lower airflow, and improve the effect of flow disturbance, in this case, there is no strong correspondence between the change of the wind speed and the exertion of the vibration reducing function of the streamlined body (the characteristic parameters of the helix line in the background technology correspond to a certain wind speed interval), that is, regardless of changes of the wind speed, the floating streamlined body can normally suppress vibrations in its floating height region.

When to construct a wind farm at a high-altitude region such as Yunnan, Guizhou, Sichuan in the south of China, it is necessary to build a road around mountains. Moreover, the period of hoisting on a mountain is usually long. The uncertainty of the wind will affect the hoisting construction at any time. The cost of the hoisting ranges from 270,000 to 320,000 CNY/per set, once some issues occur in the hoisting, the loss is huge. The inventors of this application made field investigation to the construction of wind frames in high-altitude and mountain regions, and proposed the solution of the streamlined body, to allow the on-site hoisting schedule and installation period to be no longer limited by wind conditions of local regions. The arrangement of the streamlined body can ensure or strive for reliable hoisting of the nacelle when the wind speed is less than 8 m/s; and hoisting of the tower when the wind speed is less than 10 m/s. Under the above two wind speeds, the hoisting may fail to be performed normally when using the conventional hoisting method. This solution can improve the safety and efficiency of hoisting in the limited hoisting time, shorten the delay of the construction period of the wind farm caused at any time by the uncertainty of the wind, reduce the waste caused by the delay of the grid-connected power generation of the wind power generator set, address the issue of damage and hidden dangers to the foundation connectors of the tower caused by wind-induced swaying suffered by the tower itself as a structure for carrying the wind power generator set in the process of hoisting; and reduce construction costs, help investors to receive benefit early and perform grid-connected power generation early.

BRIEF DESCRIPTION OF THE DRAWINGS

FIG. 1-2 is a schematic view showing that a tower is hoisted in segments;

FIG. 2 is a schematic view showing the structure of a tower having a certain vibration suppression function;

FIGS. 3-1 to 3-6 are schematic views showing the relationship between vortex shedding from a cylinder (bypass flow detachment) and six intervals of Reynolds number respectively;

FIG. 4 is a schematic view showing the structure of an embodiment of a tower surrounded by a streamlined body according to the present application;

FIG. 5-1 is a top view of FIG. 4;

FIG. 5-2 is a top view of the streamlined body in FIG. 4;

FIG. 5-3 is a schematic partially enlarged view showing a part I in FIG. 5-2;

FIG. 5-4 is a schematic partially enlarged view showing a part II in FIG. 4;

FIG. 5-5 is a schematic view showing that the streamlined body in FIG. 4 sways as the direction of the upwind incoming flow changes;

FIG. 6 is a schematic view of an attack angle of an airfoil;

Figure 1:
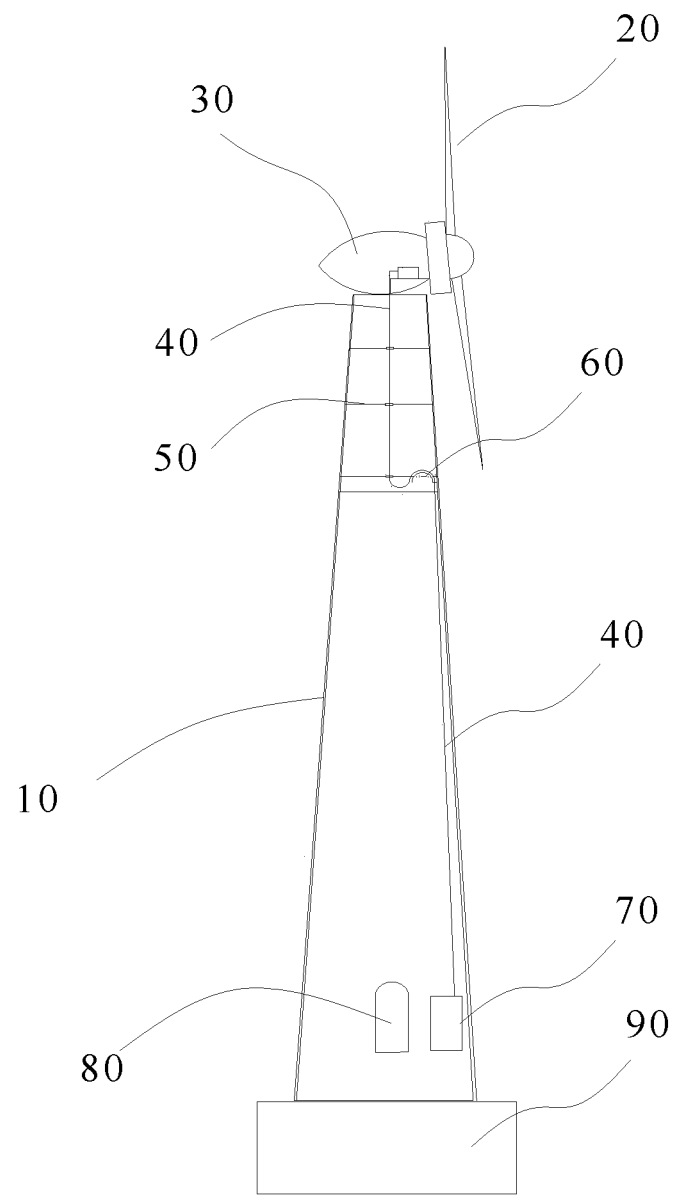
FIG. 1-1 is a schematic view showing the composition of a wind power generator set.

Reference numerals in FIGS. 1-1 to 3-6 are explained as follows:

10 tower,
11 first tower segment,
12 second tower segment,
13 third tower segment,
14 fourth tower segment,
15 fifth tower segment,
10a helix line,
20 impeller,
30 nacelle,
40 power transmission cable,
50 cable retainer fixing plate,
60 saddle bracket,
70 converter cabinet,
80 tower door,
90 ground foundation;

Reference numerals in FIGS. 4 to 24 are explained as follows:

100 tower,
101 first tower segment,
102 second tower segment,
103 third tower segment,
104 fourth tower segment,
105 fifth tower segment;
200 streamlined body,
201 leading edge,
202 tail portion,
203 elastic sphere,
203a internally hidden portion,
203b exposed portion,
204 valve core,
205 internal pipeline,
206 wireless electronic lock,
207 central through hole,
200a outer side outer surface,
200b inner side outer surface,
200c abutment surface;
300 ground foundation;
400 nacelle,
401 gas collection device,
402 recovery port,
403 recovery pipe;
500 impeller;
600 tether,
601 rope segment;
602 elastic segment;
S gap;
R convergent-divergent flow channel,
R1 gradually convergent flow channel,
R2 throat portion,
R3 gradually divergent flow channel.

DETAILED DESCRIPTION OF EMBODIMENTS

For enabling the person skilled in the art to better understand the technical solutions of the present application, the present application is described further in detail hereinafter with reference to the drawings and embodiments.

Figures 1, 2:
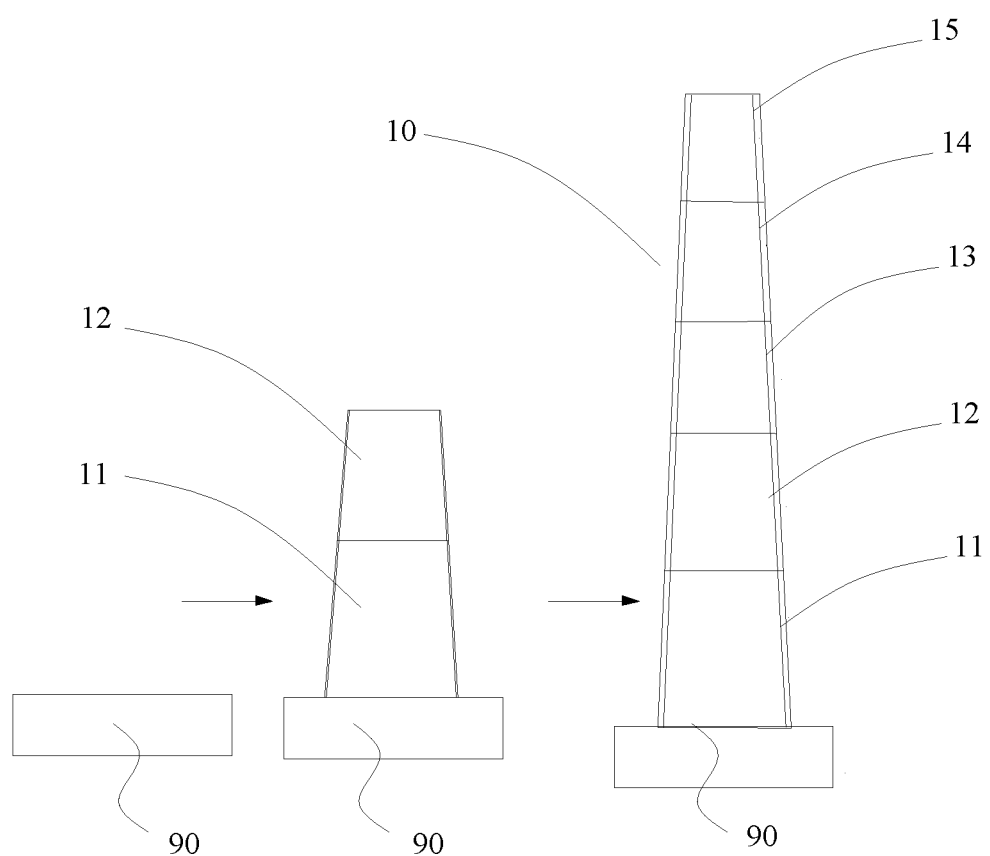
Figure 2:
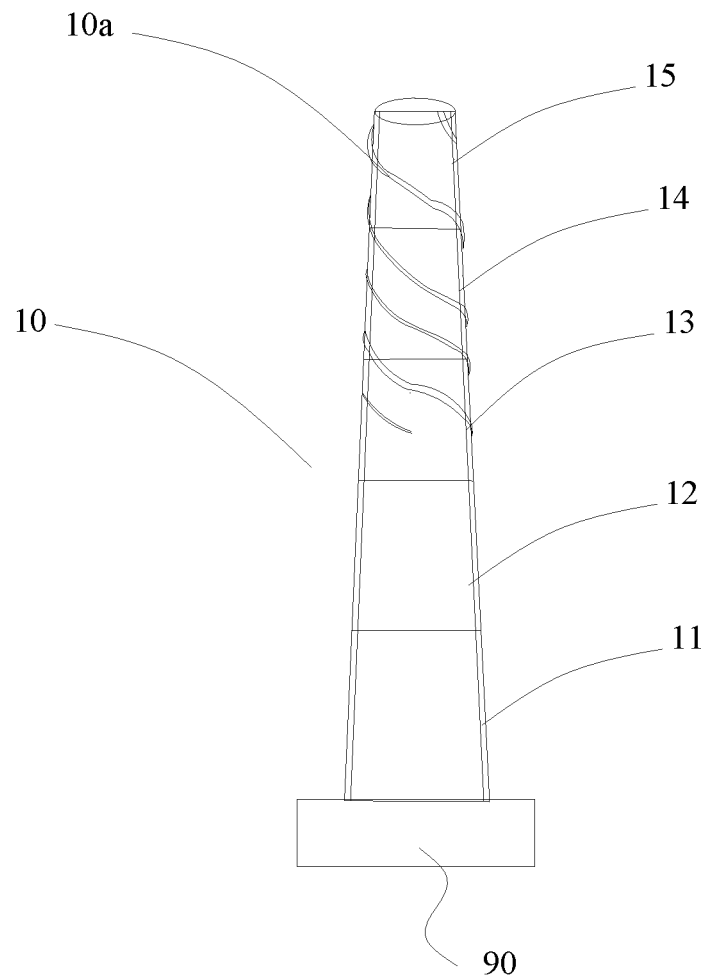
Figures 1, 3:
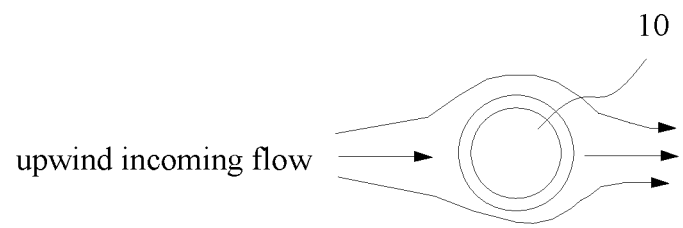
Figures 2, 3:
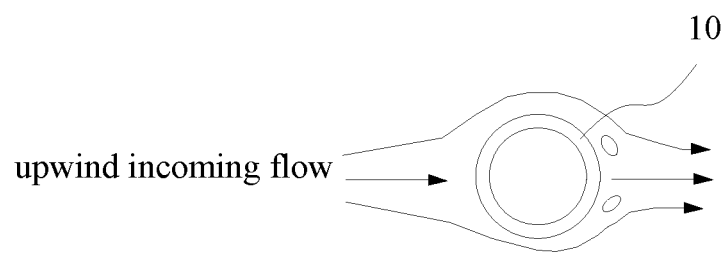
Figure 3:
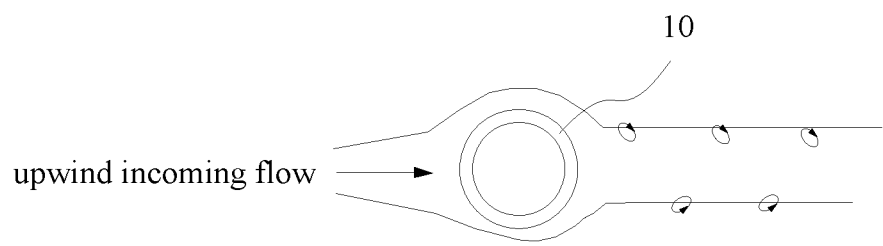
Figures 3, 4:
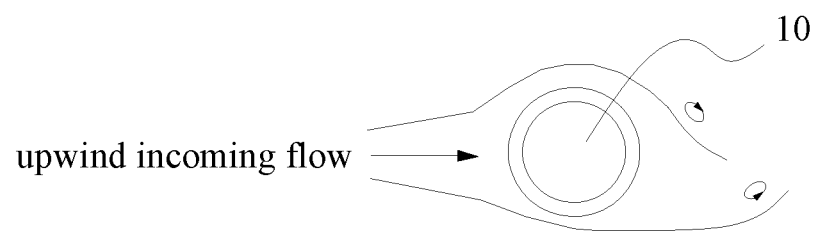
Figures 3, 4, 5:
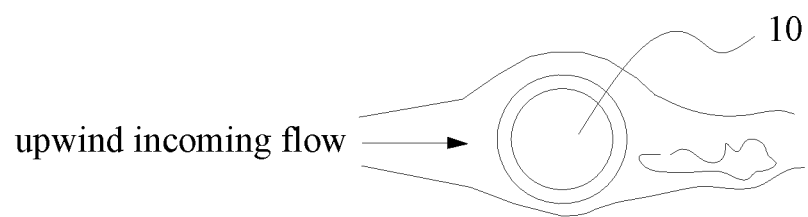

Referring to FIG. 4, FIG. 4 is a schematic view showing the structure of an embodiment of a tower surrounded by a streamlined body according to the present application. FIG. 5-1 is a top view of the tower in FIG. 4. FIG. 5-2 is a top view of the streamlined body in FIG. 4. FIG. 5-3 is a schematic partially enlarged view showing a part I in FIG. 5-2. FIG. 5-4 is a schematic partially enlarged view showing a part II in FIG. 4. FIG. 5-5 is a schematic view showing that the streamlined body in FIG. 4 sways as a direction of the upwind incoming flow changes.

As shown in FIG. 4, the tower 100 is installed on a ground foundation 300, and the tower 100 is formed by sequentially connecting five tower segments from bottom to top, and the five tower segments are respectively a first tower segment 101, a second tower segment 102, a third tower segment 103, a fourth tower segment 104 and a fifth tower segment 105 shown in the Figure. It may be appreciated that the tower 100 can include other number of segments, which is not limited to five.

A streamlined body 200 is provided to sleeve on the tower 100, as shown in FIG. 4, the streamlined body 200 surrounds the fourth tower segment 104 of the tower 100. Referring to FIG. 5-2, the streamlined body 200 is in a complete annular shape, and has a central through hole 207, so as to surround to the tower 100 and accommodate the tower 100. The streamlined body 200 according to this embodiment is specifically in a "fish" shape. It can be seen from FIG. 5-2 that the streamlined body 200 is a bionic structure. A left end is a leading edge 201 of the streamlined body 200 and corresponds to the position of a "fish mouth", and a right end is a tail portion 202 of the streamlined body 200 and corresponds to a "fish tail".

When the upwind incoming flow comes into contact with the leading edge 201 of the streamlined body 200, it is divided into at least four parts: a portion of airflow that is inclined upwards after flowing over the leading edge 201 of the streamlined body 200, a portion of airflow that is inclined downwards after flowing over the leading edge 201 of the streamlined body 200, and still some airflows that flow to right or left, that is, flow to two sides of the streamlined body 200.

Obviously, when a portion of airflow of the upwind incoming flow is inclined upward, a positive attack angle is formed, and the portion of the airflow inclined downwards forms a negative attack angle.

In explaining the principle that the above streamlined body 200 can suppress vibrations of the tower 100, terminologies such as "attack angle" and "aerodynamic configuration" may be involved, which are explained below.

Figures 3, 4, 5, 6:
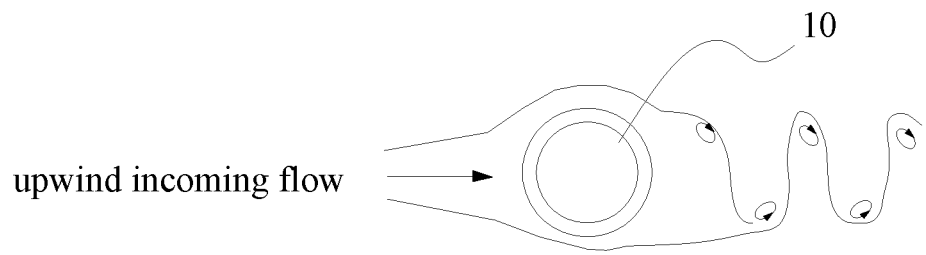
Figure 4:
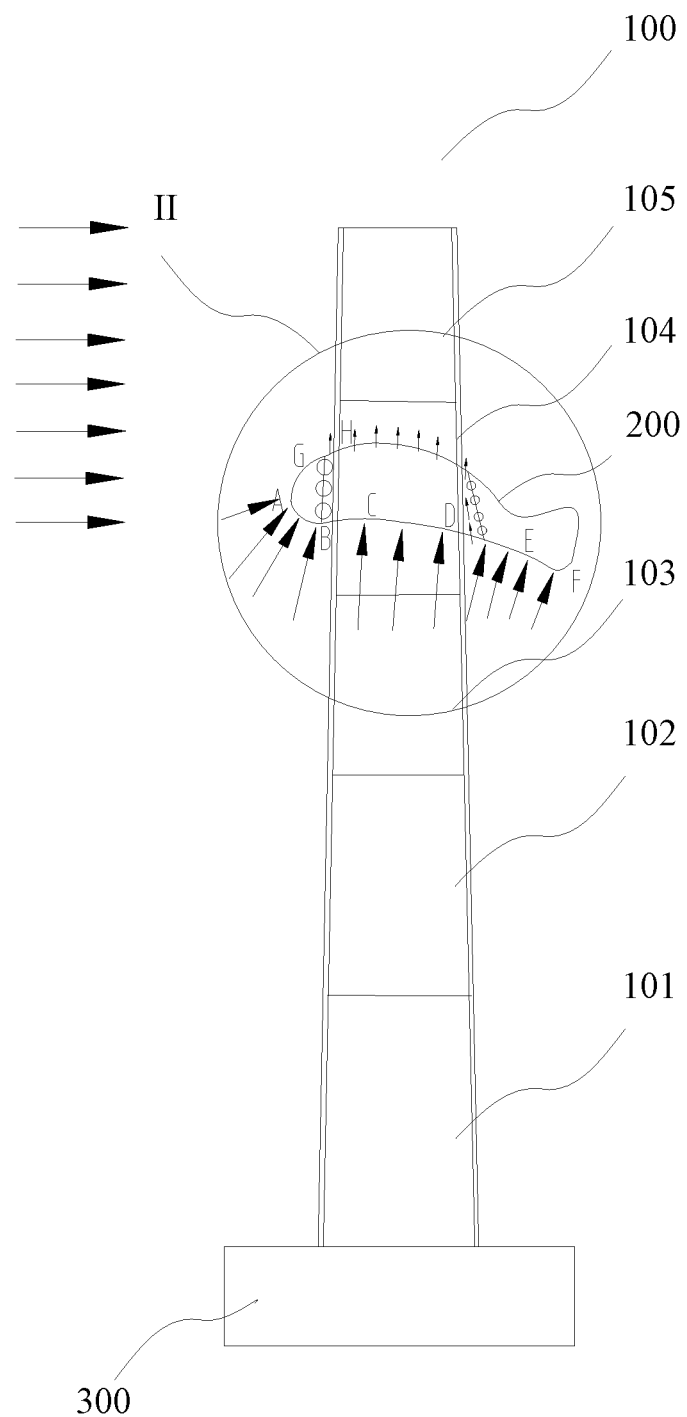
Figures 1, 5:
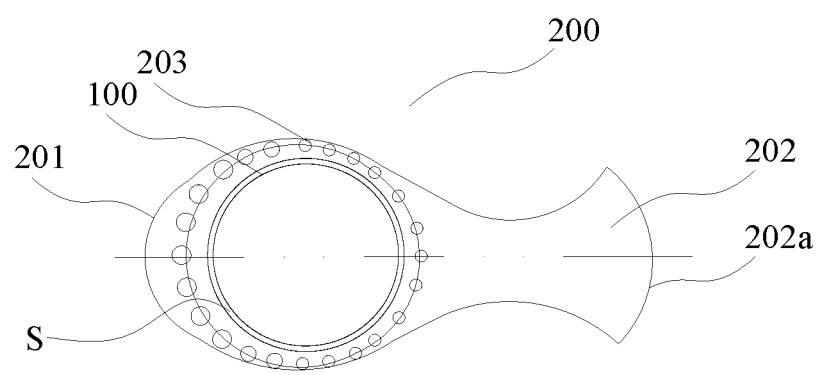
Figures 2, 5:
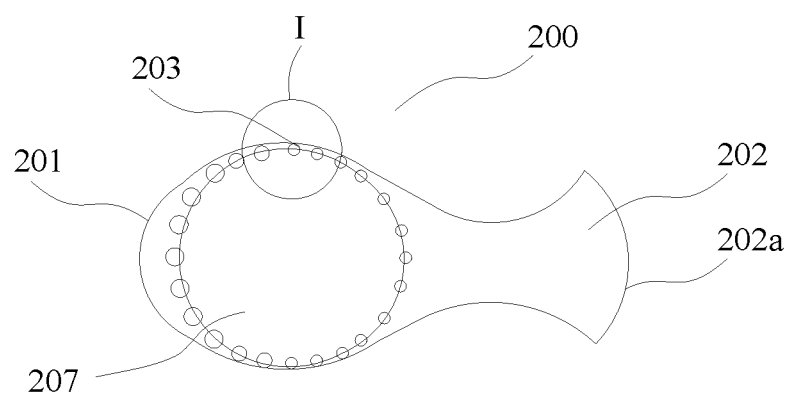
Figures 3, 5:
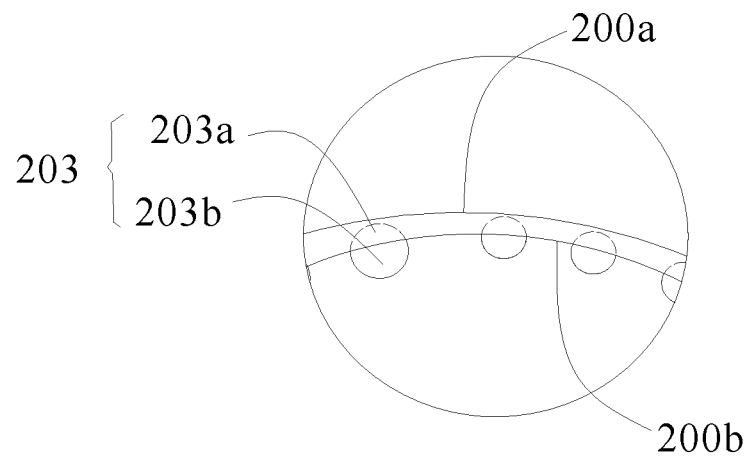
Figures 4, 5:
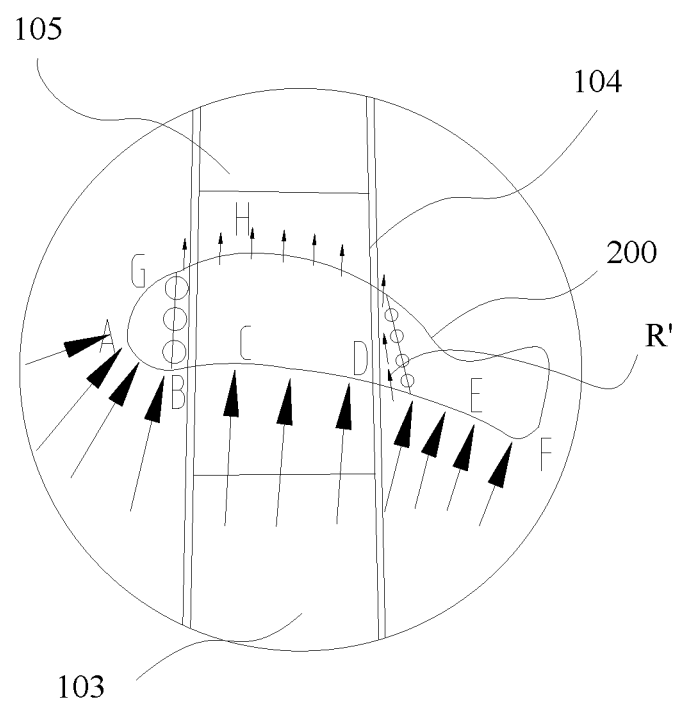
Figure 5:
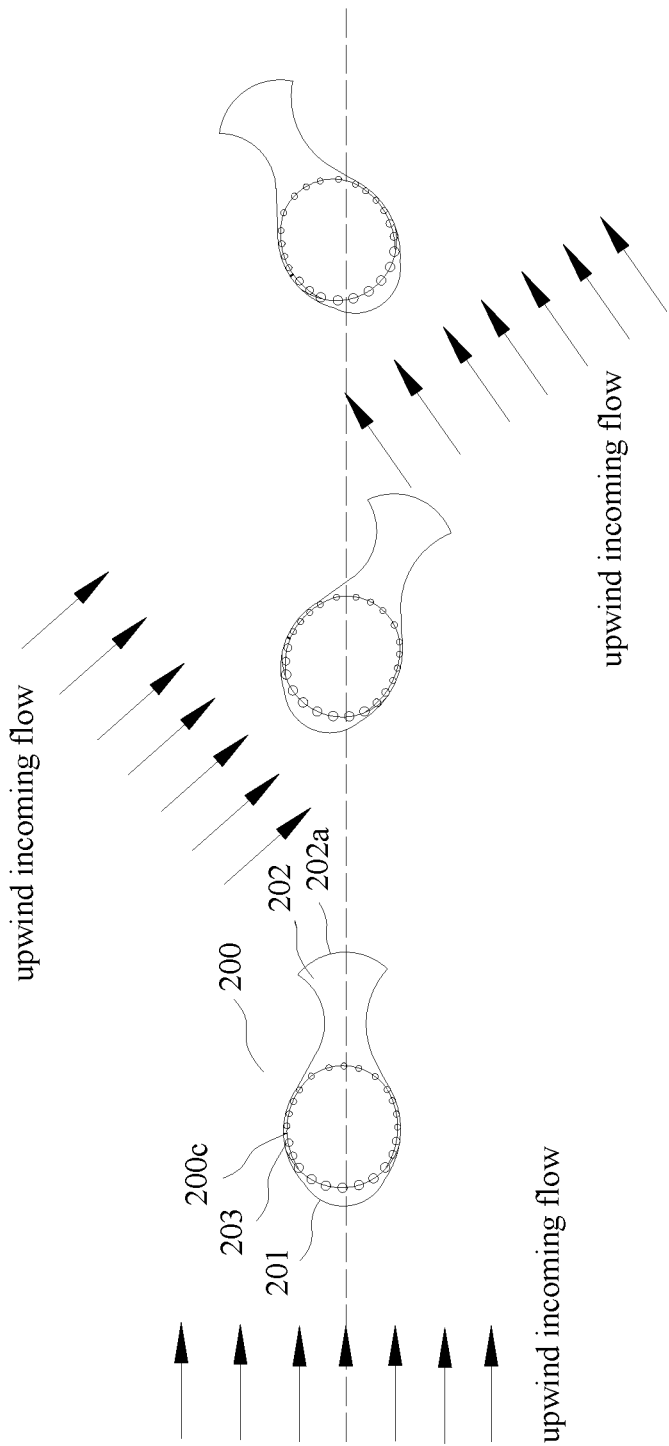
Figure 6:
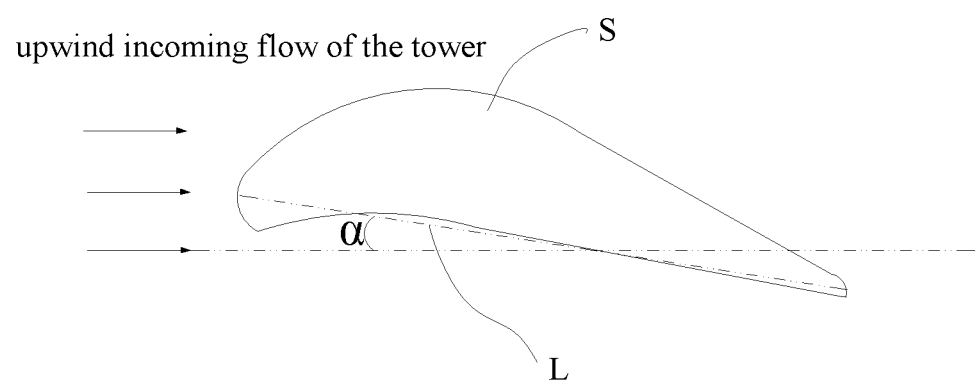
Figure 7:
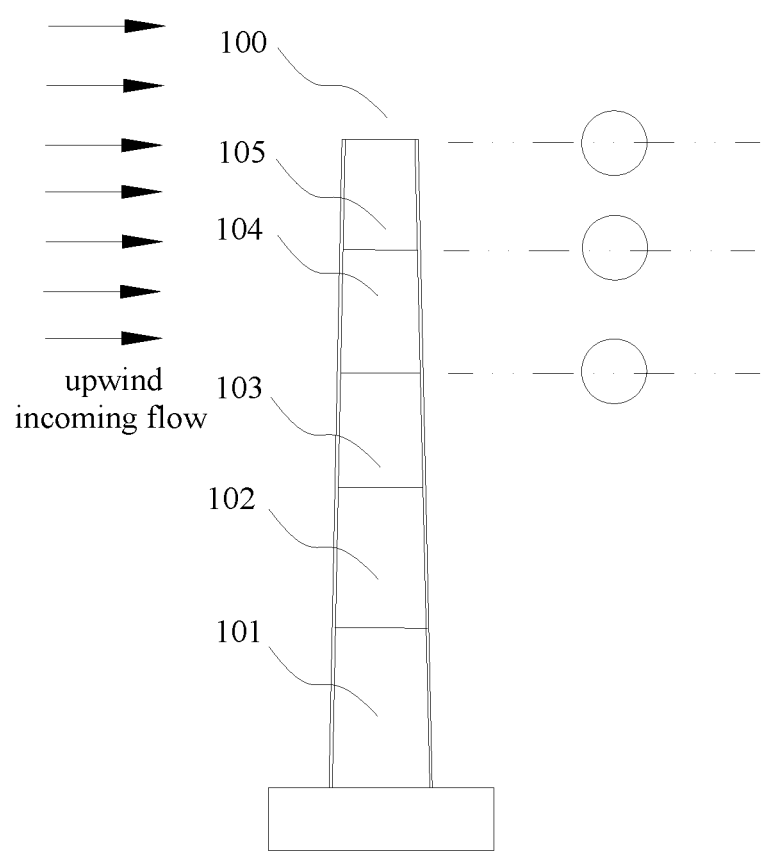
FIG. 7 is a schematic view showing an aerodynamic configuration of the tower without being surrounded by the streamlined body.
Figure 8:
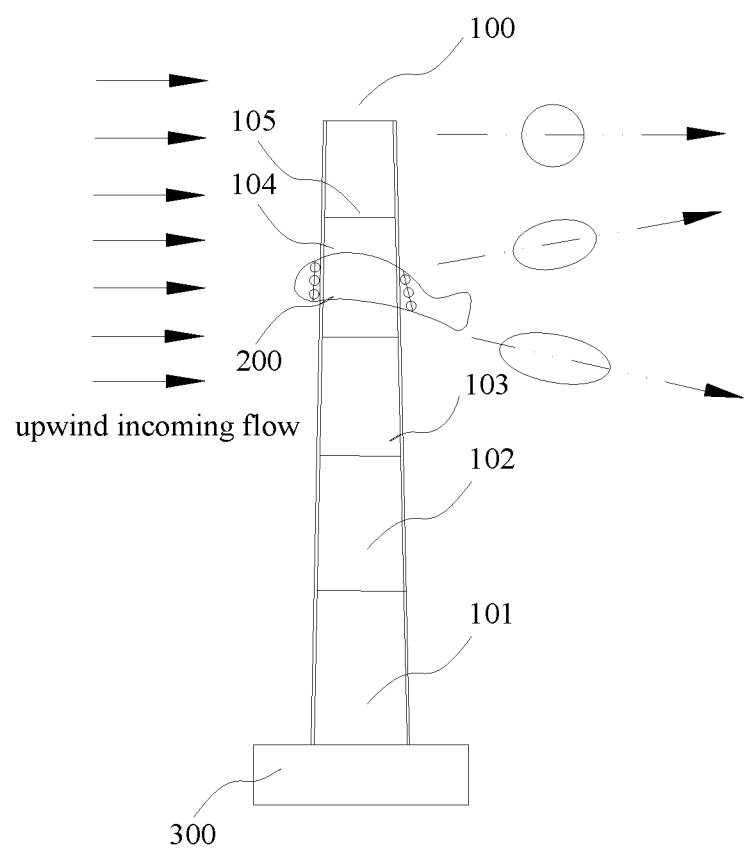
FIG. 8 is a schematic view showing the upwind incoming flow in FIG. 4 with a changed attack angle and changed aerodynamic configuration.

Reference may be made to FIGS. 6 to 8 for the specific principles. FIG. 6 is a schematic view of an attack angle of an airfoil. FIG. 7 is a schematic view showing an aerodynamic configuration of the tower 100 without being surrounded by the streamlined body 200. FIG. 8 is a schematic view showing the upwind incoming flow in FIG. 4 with a changed attack angle and changed aerodynamic configuration.

The attack angle is sometimes also referred to as an angle of attack and is a fluid mechanics noun. For an airfoil section S, the attack angle α is defined as an angle between a chord L and a direction of a speed of the upwind incoming flow, when a head of the chord L is raised, the attack angle is positive, and when the head of the chord L is lowered, the attack angel is negative. As shown in FIG. 8, at the location provided with the streamlined body 200, the airflow inclined upwards after flowing over the leading edge 201 of the streamlined body 200 forms a positive attack angle (an angle of the airflow with respect to a right-left horizontal direction), and the airflow inclined downwards after flowing over the leading edge 201 of the streamlined body 200 forms a negative attack angle, and the tower 100 is correspondingly formed with an elliptical aerodynamic configuration.

Aerodynamic configuration refers to a configuration suitable for an object to move in a gas medium adopted by the object moving in the gas medium for reducing motion resistance. The aerodynamic configuration is a concept proposed mainly for missiles, airplanes and the like, and the concept is applied to the tower 100 herein. The aerodynamic configuration specifically refers to a function value consisting of an elevating force, a resistance subjected by an airplane or a missile in a flying state, directions and magnitudes of the forces and objective factors which may have an effect on flying of a flyer such as the section, length, thrust and stability of the flyer itself, and the configuration of the flyer is determined by the function value.

As the direction of the upwind incoming flow changes, the aerodynamic configuration changes accordingly. When the upwind incoming flow is in a horizontal direction, the aerodynamic configuration is circular, as shown in FIG. 7, in each case that the upwind incoming flow comes into contact with the tower 100, the aerodynamic configuration is circular, and is a bluff body. In FIG. 8, no streamlined body 200 is provided at the position of the fifth tower segment 105, and the aerodynamic configuration there is also circular (that is, the cross-sectional shape of the tower 100); and when the incoming flow is inclined upwards or downwards to contact with the tower 100, the aerodynamic configuration will be in an elliptical shape. The changes of the aerodynamic configuration of the tower 100 caused by the streamline shape of the streamlined body 200 are not always the same, as shown in FIG. 8, the elliptical aerodynamic configuration in the middle has a relatively small attack angle; and the lower elliptical aerodynamic configuration has a long to short axis ratio greater than a long to short axis of the middle elliptical aerodynamic configuration, and has a relatively large attack angle and is more streamlined.

It should be known that for the tower 100 immersed in the fluid, due to an unbalanced force since airflow vortexes generated when fluid (for example, an airflow in a wind farm) flows or sweeps over an outer surface of the tower 100 shed from two sides of the tower 100 (pertains to a bluff body) to leave the surface of the tower 100, lateral forces may be generated at the positions of vortex shedding at two sides of the tower 100 to be oriented to the respective sides, and the alternating shed cortexes cause the tower 100 in such a way to perform an approximate simple harmonic (i.e., sinusoidal) lateral wind (the upper part and a middle part of the tower 100 tow a lower part of the tower 100) forced vibrations, which is referred to as vortex-induced resonances. That is, the vortex-induced resonances generated by vibrations induced by the Karman vortex street phenomena mentioned in the background technology.

During the occurrence of vortex-induced resonances in the tower 100, the vortex-induced force (i.e., the unbalanced force) acting on the outer surface of the tower 100 is approximately a simple harmonic force F (t):

$$F(t) = F_0 \sin \omega t \tag{1}$$

in the formula: ω(Re,St) is the frequency of the vortex shedding, the result of ωt is a variable;

Re is the Reynolds number and St is the Strouhal number;

$F_0$ is the amplitude of vertex-induced force, $F_0 = (\rho U^2/2) CD$; ρ is the density of the upwind incoming flow of the tower 100;

U is a wind speed of the upwind incoming flow of the tower 100;

C is an aerodynamic coefficient of the section of the tower 100; the aerodynamic coefficient is also called a wind load type coefficient. It is the ratio of a pressure (or suction) formed by the wind on the surface of the engineering structure to a theoretical wind pressure calculated according to the wind speed of the incoming flow. It reflects the distribution of a stable wind pressure on the surface of an engineering construction and the surface of a building, and varies with the airflow direction, and the shape, scale, shielding conditions of the building;

D is a feature dimension of an outer surface of the tower 100 when being swept over by fluid, and is a feature dimension of a space structure formed by an obstacle facing the fluid when the fluid bypasses the obstacle and flows around the obstacle, and is a generic term in the heat transfer field. In this embodiment, it refers to the feature dimension of a contact surface, in contact with the fluid (here the fluid is airflow), of the enclosure (here it means the shape of the outer surface of the tower), and it generally employs the width of the structure perpendicular to the wind direction, i.e., an outer diameter of the tower 100 at the corresponding height.

The variation of amplitude of lateral vibration of the tower 100 caused by a vortex-induced force is:

$$A(t) = \frac{\pi}{\delta} \frac{1}{K} (\rho U^2 / 2) CD \sin \omega t \tag{2}$$

in the formula: K is the stiffness of a structure system (which may include a nacelle 400) of the tower 100; and δ is logarithmic decrement (about 0.05).

When the wind speed of the upwind incoming flow reaches a certain suitable value and maintains for a certain period of time, vortex-induced resonances may occur in the tower 100. The amplitude A of the vibration here is:

$$A = \frac{\pi}{\delta} \frac{\rho C f^2}{2K(St)} D^3 \tag{3}$$

It can be seen that when the size of the section of the structure is fixed, the amplitude of the vortex-induced resonances can be reduced by improving the stiffness K or increasing the damping.

The above formula $$St = \frac{fD}{U},$$

i.e., the Strouhal number, defines the relationship between a vortex shedding frequency, a wind speed, and a cylinder diameter.

In the formula: f is the vortex shedding frequency, Hz;

U is the wind speed of the upwind incoming flow of the tower 100;

D is a feature dimension of an outer surface of the tower 100 when being swept over by fluid.

In this embodiment, D refers to the outer diameter, at different heights, of the tower 100. The outer diameter may change. When the upwind incoming flow flows around the tower 100 not in a horizontal direction but at a certain inclination angle, the path of the flow bypassing the periphery of the tower 100 is formed approximately elliptical, as the description of the above aerodynamic profile. In this case, the feature dimension D is just an equivalent diameter (a terminology in the heat transfer field, which is the diameter of an imaginary circular section, i.e., the diameter of a non-circular section converted into a circular section according to the perimeter) of the ellipse of aerodynamic profile. In this case, the boundary that is wetted by the fluid or in contact with the fluid becomes more streamlined, and be away from being blunted. Viewed from the vibration form, vortex-induced resonance is an amplitude-restricted vibration having dual characteristics of being self-excited and forced.

Figure 9:
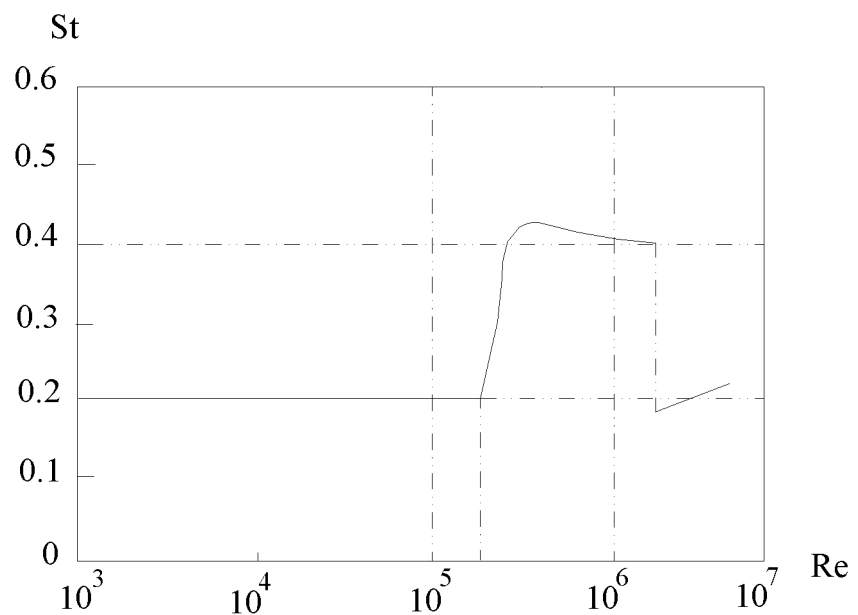
FIG. 9 is schematic view showing the relationship between the Strouhal number and the Reynolds number of the fluid on the outer surface of the tower.

The Strouhal number can be obtained based on the Reynolds number. Reference may be made to FIG. 9 for the relationship of the Strouhal number with the Reynolds number. FIG. 9 is a schematic view showing the relationship between the Strouhal number and the Reynolds number of the fluid on the outer surface of the tower, and the horizontal axis represents the Reynolds number, and the vertical axis represents the Strouhal number. Before the Reynolds number reaches $2 \times 10^5$, the Strouhal number is a constant 0.20; after that, as the Reynolds number increases, the Strouhal number first jumps to 0.30, then increases to 0.43, and then when the Reynolds number equals $2 \times 10^6$, it drops to 0.2 again. Therefore, each of the Strouhal number, D and U is a parameter that can be obtained, and f can also be calculated based on the formula of the Strouhal number, and accordingly, the amplitude A can also be calculated.

Accordingly, in this solution, the streamlined body 200 is surrounded on the tower 100, to achieve the vibration reducing effect, and the principle of which is analyzed as follows.

1. When the upwind incoming flow flows around the tower 100 and comes into contact with the streamlined body 200, the aerodynamic configuration is changed, and the aerodynamic coefficient C of the tower 100 becomes small after the bypass flow of the tower 100 becomes relatively streamlined. It can be understood that the amplitude A of the vortex-induced resonance can be reduced as the resistance is reduced, and the vibrations can be reduced.

Further quantitative analysis can be performed. When the aerodynamic configuration becomes elliptical, the aerodynamic coefficient C can be reduced from the general 1.2 to about 0.6 or even smaller (such as 0.5), which greatly reduces the resistance and reduces the vibrations. To understand in a visualized manner, when the upwind incoming flow horizontally sweeps over the tower 100, the aerodynamic configuration in contact with the outer surface of the tower 100 is circular, and pertains to a bluff body, which requires the wind direction to be changed abruptly, and may cause a large unbalanced force. After the attack angle changes, the aerodynamic configuration is elliptical, the track of the fluid (that is, the airflow) moving rearwards (i.e., the downwind side) along the surface of the tower 100 is elongated, and the angle at which the fluid comes into contact with the outer wall of the tower 100 changes. Since the airflow moves to be inclined upwards, the contact angle becomes small, and based on the slow change of the wind direction, it facilitates the suppression of occurrence of bypass flow detachment phenomenon when the airflow flows around the outer wall of the tower 100, to thereby inhibiting the generation of unbalanced force in the lateral wind direction to the tower 100, and reducing vibrations generated by the unbalanced force in the process that the airflow couples the outer wall of the tower 100.

2. After the upwind incoming flow flows over the stream line body 200, at the position corresponding to the streamlined body 200, the direction and path of the airflow are changed, which disrupts the correlation of the upwind incoming flow near the streamlined body 200, and disrupts the consistence of frequencies of vortex shedding of the airflow at the streamlined body 200 and other positions, thus weakening their co-action, reducing or preventing the vortex-induced resonance response when bypass flow detachment occurs in the boundary layer at the outer surface of the tower 100, thereby preventing the vibrations induced by the vortexes at the tower 100.

Correlation is an important feature of fluctuating wind, here it is related to the fluctuating wind speeds at two points in the space or the fluctuating pressures at two points at different heights on the surface of the tower 100.

The correlation coefficient ρ is defined as $$\rho = \frac{\overline{u'(Z_1)u'(Z_2)}}{\sigma_u(Z_1)\sigma_u(Z_2)},$$

at two different heights ($Z_1$, $Z_2$), the covariance of the fluctuating wind speeds is defined as follows:

$$\overline{u'(Z_1)u'(Z_2)} = \frac{1}{T}\int_0^T [U(Z_1, t) - \overline{U}(Z_1)][U(Z_2, t) - \overline{U}(Z_2)]dt,$$

therefore, the covariance is the time average of the product of the fluctuating wind speeds at the two heights. The wind speed values on the right side of the equation have their respective average values $\overline{U}(Z_1)$ and $\overline{U}(Z_2)$ subtracted respectively.

In mathematics, the formula of standard deviation can be written as:

$$\sigma_U = \left\{\frac{1}{T}\int_0^T [U(t) - \overline{U}(Z)]dt\right\}^{\frac{1}{2}},$$

in the formula, U(t) represents a wind speed component in a direction of average wind speed, and is equal to $\overline{U}(Z)+u(t)$; u(t) is a turbulence component in the downwind direction, that is, the fluctuating wind speed component in the direction of average wind speed.

The numerator represents the covariance of the different fluctuating wind speeds at two different heights of the tower 100.

The covariance is the time average of the product of the fluctuating wind speeds at the two heights.

The overall intensity of turbulence can be measured by root mean square or standard deviation of wind speeds, an average component is subtracted from the wind speeds, and then the deviations are used to quantify the remainders, the deviations are squared and then averaged, and the averaged value is finally extracted, to get a physical quantity having a wind speed unit, thus obtaining the standard deviation. According to the equation of definition of the correlation coefficient, the covariance of wind speeds at different heights is divided by the standard deviation to obtain the correlation coefficient between the two wind speeds at different heights. The correlation is the smaller the better. With a small correlation, the frequencies of vortexes at different heights after the vortexes are formed can be hindered to be consistent, and the accumulation and increasing of the vortex-induced resonance energy facilitated by the consistency of the vortex shedding frequencies is disrupted, that is, preventing the increase of vortex-induced resonances, and even causing the vortex-induced resonances to disappear.

When constructing a wind farm at a high-altitude region such as Yunnan, Guizhou, Sichuan in the south of China, it is necessary to build a road around mountains. Moreover, the period of hoisting on a mountain is usually long. The uncertainty of the wind will affect the hoisting construction at any time. The cost of the hoisting ranges from 270,000 to 320,000 CNY/per set, once some issues generate in the hoisting, the loss is huge. The inventors of this application made field investigation to the construction of wind frames in high-altitude and mountain regions, and proposed the solution of the streamlined body 200, to allow the on-site hoisting schedule and installation period to be no longer limited by wind conditions of local regions. The arrangement of the streamlined body 200 can ensure or strive for reliable hoisting of the nacelle 400 when the wind speed is less than 8 m/s; and hoisting of the tower 100 when the wind speed is less than 10 m/s. Under the above two wind speeds, the hoisting may fail to be performed normally when using the conventional hoisting method. This solution can improve the safety and efficiency of hoisting in the limited hoisting time, shorten the delay of the construction period of the wind farm caused at any time by the uncertainty of the wind, reduce the waste caused by the delay of the grid-connected power generation of the wind power generator set, address the issue of damage and hidden dangers to the foundation connectors of the tower 100 caused by wind-induced swaying suffered by the tower 100 itself as a structure for carrying the wind power generator set in the process of hoisting; and reduce construction costs, help investors to receive benefit early and perform grid-connected power generation early.

In addition, in this solution, the streamlined body 200 is configured as a fish shape, this actually further achieves the object of floating under the action of the upwind incoming flow. The streamlined body 200, which is capable of floating, is a relatively mature solution in the field of fluid mechanics, such as an airplane wing. In this solution, a fish-like bionic structure is adopted (most of the fish in the ocean can float in the fluid based on the shape of body thereof, such as cuttlefish), the floating is achieved by a floating force generated by a pressure difference formed between an upper surface and a lower surface.

Figure 10:
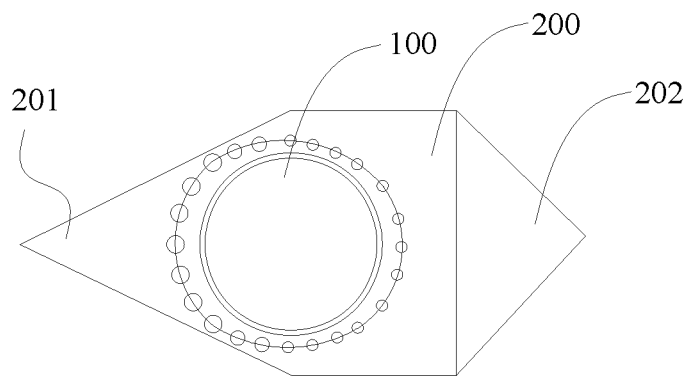
FIG. 10 is a schematic view showing the structure of another streamlined body.

Further, as shown in FIG. 10, FIG. 10 is a schematic top view showing the structure of another streamlined body 200. The streamlined body 200 has a streamlined leading edge 201 and tail portion 202, and the streamlined body 200 of such a structure can float as well. Viewed from the top view, the streamlined body 200 has a relatively pointed shape at the leading edge 201 part, and is then gradually widened to two sides, and then has a small change in width, and is finally narrowed at the tail portion 202, the tail portion 202 has a relatively small length, which is similar to the shape of an aircraft.

Figure 11:
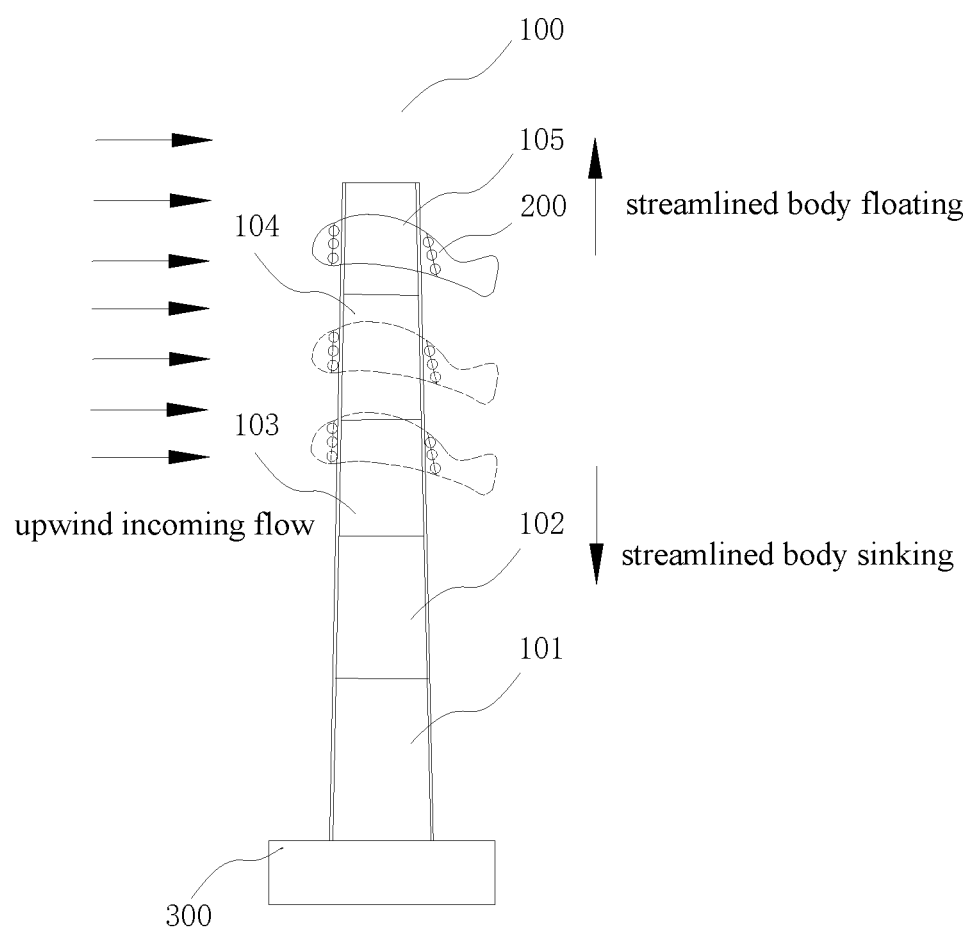
FIG. 11 is a schematic view showing that the streamlined body in FIG. 4 floats or sinks.
Figure 12:
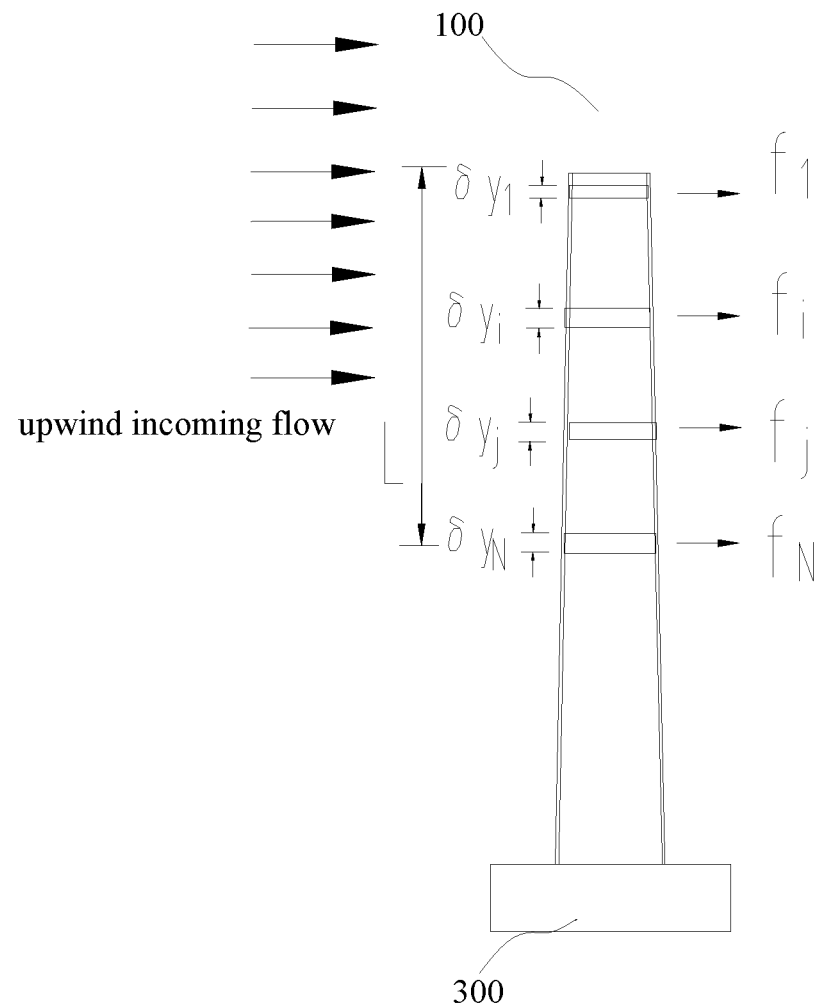
FIG. 12 is a schematic view showing that the total fluctuating wind force formed when the upwind incoming flow flows around the tower is weakened by the streamlined body when floating and down.

When the streamlined body 200 is designed as a floatable structure, the wind speed of the upwind incoming flow tends to change more or less, and the floating force of the streamlined body 200 may also change accordingly, thus, the streamlined body 200 may play in a vertical direction of the tower 100, as shown in FIGS. 11 and 12. FIG. 11 is a schematic view showing that the streamlined body 200 in FIG. 4 floats or sinks; and FIG. 12 is a schematic view showing that the total fluctuating wind force formed when the upwind incoming flow flows around the tower 100 is weakened by the streamlined body 200 when floating and down.

In this embodiment, only one streamlined body 200 surrounds the tower 100, and the streamlined body 200 can float to the fifth tower segment 105, or can sink to the third tower segment 103 as shown in FIG. 11. Of course, what is shown in the figure is merely an illustration, and the specific floating height region is not limited thereto.

It can be seen that when the streamlined body 200 is designed as a floatable configuration, it may float and sink irregularly, equivalent to moving vertically in a height direction of the tower 100 (at least at the upper part of the tower 100), similar to brushing up and down with a "brush", to constantly change the attack angles and aerodynamic configurations of the tower segments at different heights, hinder the formation of vortexes on two sides rearward of the tower 100, so that the consistency of the frequencies of the vortex shedding at the upper part and the lower part of the tower 100 is disrupted, thereby suppressing the occurrence of vortex-induced vibrations. Further, the streamlined body 200 may also sway when floating and sinking vertically, and collide with the outer wall of the tower 100, and disrupt the bypass flow of the boundary layer in the vicinity of the tower 100, which may also inhibit the formation of vortexes and suppress vibrations.

As shown in FIG. 12, since when vibrations occur in the upper part of the tower 100 (an upper end of the tower 100 in this case pertains to a free end, and a lower end is fixed, vortex shedding produces unbalanced lateral wind forces, and these forces have a long arm of force with respect to the fixed end, at the foundation, of the tower 100), the vibration moment is the largest and the damage of the vibrations is serious, therefore, the streamlined body 200 is arranged at the upper part of the tower 100, and floats up and down in the region of height L shown in the figure. When the streamlined body 200 is at $\delta y_1$, the airflow corresponds to the position $f_1$, and the airflow at an upper side or lower side of this position $f_1$ is disturbed by the streamlined body 200. When the streamlined body 200 sinks to $\delta y_i$, it disturbs the airflow at the position $f_1$, and similarly, the positions $\delta y_j$ and $\delta y_n$. While the airflow at the various positions are disturbed, the consistency of the unbalanced lateral wind forces (the attribute of the unbalanced lateral wind forces, including same direction and same frequency) generated by vortex shedding on the outer surfaces of the upper segment and the lower segment in the vertical height direction of the outer wall of the tower 100 is ruined or disrupted, thus the total fluctuating wind force in the height region L (the value of the sum of the unbalanced lateral wind forces with the attribute of direction) is weakened.

Moreover, based on the floating design of the streamlined body 200, even in the case that only one streamlined body 200 is provided, the bypass flow in the boundary layer near the outer wall of the tower 100 at different heights may just be disturbed, and the vortex-induced vibrations may be suppressed. Of course, the number of the streamlined body 200 is not limited. In the case that the tower 100 has a large height, and the length of the segment where the vibration suppression is required is longer, two or more streamlined bodies 200 may be provided to float and down together, to disturb the bypass flow in the boundary layer near the outer wall of the tower 100.

It is to be noted that the streamlined body 200 configured as floatable can further improve the capability of disrupting the boundary layer, to suppress the vortex-induced vibrations. However, it is to be understood that even if the streamlined body 200 cannot float, it is also feasible to achieve the effect. According to the above vibration reducing principles 1 and 2, as long as the streamlined body 200 provided can change the aerodynamic configuration formed by a portion of the upwind incoming flow to form a positive attack angle or a negative attack angle, the boundary layer of the tower 100 and the correlation of the airflow at the upper and lower segments may just be disrupted near the streamlined body 200 to suppress vibrations. Of course, for disturbing more airflow in the vicinity of the tower 100, in the case that the streamlined body 200 cannot float or play up and down, it is required to arrange the streamlined body 200 at a higher height or to arrange a large number of the streamlined bodies 200, and comparatively speaking, the floatable design is a more preferable solution obviously, in addition to the advantages that a small number is required and a wide region can be disturbed, the flow disturbance effect achieved by playing up and down is also better.

When the above method is used for reducing the vortex-induced vibrations, compared with the helix line method in the background technology, the leading edge 201 of the streamlined body 200 is designed to be streamlined, which can reduce the resistance of the upwind incoming flow, and can reduce noise in itself, and meet the requirements of ecological regulations. Moreover, the streamlined body 200 suppresses vibrations by causing the upwind incoming flow to generate an attack angle, thus even when the wind speed changes, the exertion of the vibration suppression function can be ensured. In addition, when the streamlined body 200 is a floatable structure, it is also self-adaptive to the change of the wind speed, to float and down, stay at a higher position or a lower position, and play a corresponding role. Moreover, floating and down in a certain height region can disrupt the correlation between the upper airflow and lower airflow, and improve the effect of flow disturbance, in this case, there is no strong correspondence between the change of the wind speed and the exertion of the vibration reducing function of the streamlined body 200 (the characteristic parameters of the helix line in the background technology correspond to a certain wind speed interval), that is, regardless of changes of the wind speed, the floating streamlined body 200 can normally suppress vibrations in its floating height region.

In addition, for the fish-shaped streamlined body 200, in addition to causing the upwind incoming flow to generate a positive attack angle and a negative attack angle, the path of the upwind incoming flow flowing rearwards from two sides of the streamlined body 200 is also elongated, since the aerodynamic configuration corresponding to this portion of the airflow is actually approximately elliptical, that is, the airflow flows rearwards around two sides of the streamlined body 200, equivalent to flowing along the "fish body", and thus, the aerodynamic coefficient C of this portion of airflow also becomes small, which is similar to the above-described vibration reducing principle 1 and can suppress the vortex-induced vibrations as well.

Figure 13:
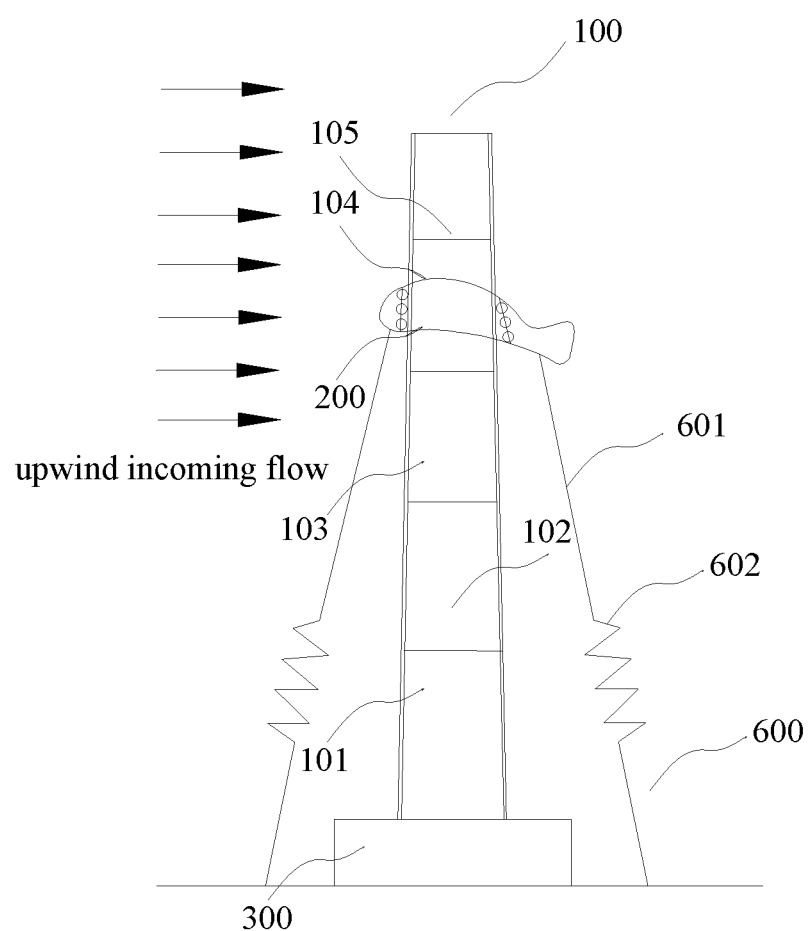
FIG. 13 is a schematic structural view of a tower provided with a tether for pulling the streamlined body.

Reference is made to FIG. 13. FIG. 13 is a schematic structural view of a tower 100 provided with a tether 600 for pulling the streamlined body 200.

As shown in the figure, one end of the tether 600 is fixed to the ground (it may also be fixed to the lower end of the tower 100), and another end of the tether 600 is connected to the streamlined body 200. With such an arrangement, it is possible to prevent the streamlined body 200 from falling off the top of the tower 100 and being separated from the tower 100 when the speed of the gust is excessively large. In order to improve the reliability and maintain the balance, the tether 600 may be provided at both the leading edge 201 and the tail portion 202 of the streamlined body 200. Of course, it is also feasible to provide the tether 600 only at one end, or at multiple positions including the two sides.

The tether 600 can be configured such that at least one segment is an elastic segment. As shown in FIG. 13, the tether 600 specifically includes a rope segment 601 and an elastic segment 602 (e.g., a spring segment), that is, the rope segment 601 and the elastic segment 602 are connected in series. In the figure, the elastic segment 602 is connected in series between two rope segments 601. Here, as long as the elastic segment 602 and the rope segment 601 are connected in series, the number and position order of the segments are not limited. In the case that the elastic segment 602 is provided, the swaying of the streamlined body 200 in the process of floating and sinking may be transmitted to the elastic segment 602, and based on the elastic property of the elastic segment 602, even if the streamlined body 200 no longer has changes of floating force causing the streamlined body to float and sink, the elastic segment 602 will continue to sway, thus allowing the streamlined body 200 to continue to maintain the swaying state even when the wind speed is constant or is changed slightly, so as to disturb the upwind incoming flow up and down, disrupt the bypass flow in the boundary layer near the tower 100, to suppress the vortex-induced vibrations.

Of course, the elastic segment 602 here can be caused actively to move by an external force in addition to elastically reciprocating under the swaying of the streamlined body 200, thereby maintaining or increasing the up and down swaying of the streamlined body 200, for example, providing a structure similar to a winding machine, to control the extension and retraction of the tether 600, thereby driving the streamlined body 200 to float up and down.

In FIG. 13, the tether 600 is provided with a segment of spring, as described above, the number of the spring is not limited, and it is feasible to connect one or more segments in series. Here, the length and the elasticity coefficient of the elastic segment 602 and the overall length of the tether 600 can be determined according to the height of the streamlined body 200 required to float, the weight of the streamlined body 200, the wind force, and other factors, and the ultimate purpose is to require the tether 600 to prevent the streamlined body 200 from falling off the top of the tower 100 without interfering with the floating of the streamlined body 200, and to be caused to sway by the elastic segment 602.

Figure 14:
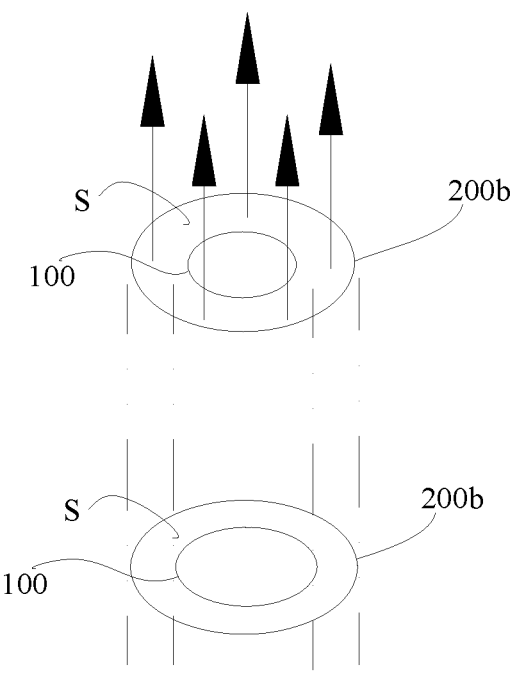
FIG. 14 is a schematic view showing the change of the size of a gap S between the tower and the streamlined body 200 when the streamlined body in FIG. 4 sinks and floats to different positions.
Figure 15:
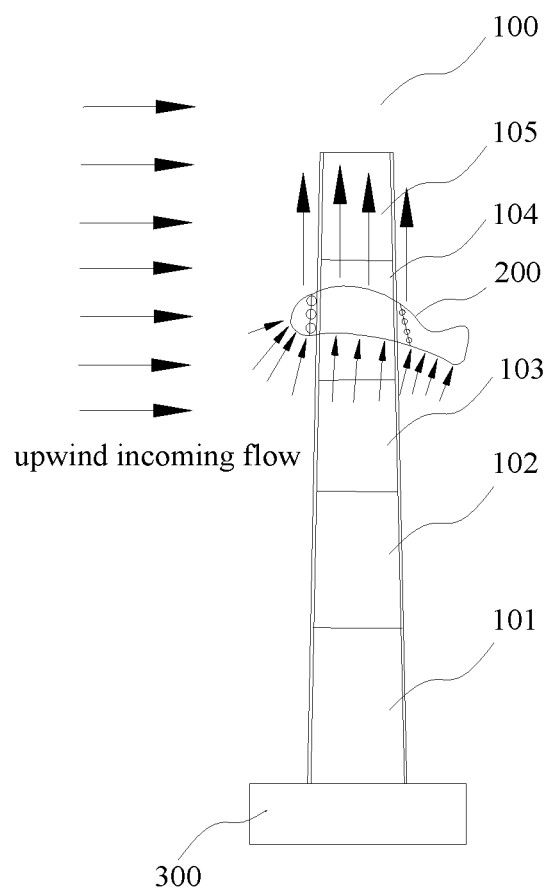
FIG. 15 is a schematic view showing that the airflow flows upwards out from the gap S.

For the measures for preventing the streamlined body 200 from falling off the top of the tower 100, reference may also be made to FIGS. 14 and 15. FIG. 14 is a schematic view showing the change of the size of a gap S between the tower 100 and the streamlined body 200 when the streamlined body 200 in FIG. 4 sinks and floats to different positions; and FIG. 15 is a schematic view showing that the airflow flows upwards out from the gap S.

As shown in FIG. 14, the tower 100 has a diameter gradually reduced from bottom to top, and when the streamlined body 200 floats upwards, the gap S between the streamlined body 200 and the outer wall of the tower 100 is gradually increased. When the streamlined body 200 floats to the top of the tower 100, the gap S is the maximum. In this solution, for the central through hole 207 of the streamlined body 200, its lateral dimension design preferably meets the following condition: when the streamlined body 200 is at the top of the tower 100, the gap S between the streamlined body 200 and the tower 100 has a predetermined distance to disrupt the floating force generated by the upwind incoming flow. When the gap S between the streamlined body 200 and the outer wall of the tower 100 is sufficiently large, the floating force of the streamlined body 200 can be weakened. Specifically, when the gap S is sufficiently large, it equivalents to communicating the upper surface with the lower surface of the streamlined body 200, which disrupts the condition for generating fluid pressure difference between the upper surface and the lower surface, and thus the floating force is no longer increased, thereby achieving self-balancing.

The "lateral" of the lateral dimension described above is the direction in which the distance from the streamlined body to the outer wall of the tower 100 can be calculated. When the central through hole 207 of the streamlined body 200 is circular, the lateral dimension is a radial dimension. The central through hole 207 may be in other shapes, such as an elliptical shape, and in this case, the lateral dimension is not only one.

When setting the dimension of the central through hole 207 of the streamlined body 200, it can be determined according to an outer diameter of the top of the tower 100. For the field of fluid mechanics, the required dimension of the central through hole 207 can be obtained specifically by dimensional calculation, simulation or wind tunnel test, this dimension can be embodied as various values depending on different application situations. This method can achieve self-balancing without requiring an external force, and can be used alone or in combination with the tether 600 to prevent together the streamlined body 200 from being falling off.

The streamlined body 200 described in the above embodiment is in the shape of a fish having a central through hole 207, which is in a closed annular shape around the tower 100. It can be understood that the solution mainly utilizes the streamline shape of the streamlined body 200 to realize the change of the attack angle to disrupt the correlation between the upper airflow and the lower airflow in the vicinity of the streamlined body 200, suppress the vortex-induced vibrations. However, when the streamlined body 200 is floatable, the effect of disturbing the boundary layer near the outer wall of the tower 100 may just be further improved. The closed annular shape here is mainly for preventing the streamlined body 200 from falling off the tower 100. It may be appreciated that, with this requirement, the streamlined body 200 is also not limited to the closed annular shape, for example, it is also feasible that the streamlined body 200 has an opening at its tail portion 202 but is capable of catching the tower 100 in the radial direction. Further for example, in this solution, the leading edge 201 is mainly used to change the attack angle of the airflow, thus the streamlined body 200 may be non-annular and have no tail portion 202. The streamlined body 200 is tied by drawstrings at two sides thereof, or is not floatable and is directly positioned on the tower 100, or is positioned on the tower 100 to yaw and rotate to the wind, all of which can achieve the object of suppressing vortex-induced vibrations to some extent.

Therefore, the "surrounding" described in this embodiment does not require the streamlined body 200 to surround in a closed circular shape, as long as it can ensure that the position of the leading edge 201 can realize the change of the attack angle of the upwind incoming flow, so it is feasible that the streamlined body 200 can surround half or more than half of the range of the tower 100.

As described above, the streamlined body 200 in this solution is specifically a fish shape of a bionic structure, and the streamlined body 200 includes the tail portion 202 opposite to the leading edge 201, as the "fish tail" shown in FIG. 5-2. With respect to the tower 100, the distance from the leading edge 201 to the tower 100 is less than the distance from the tail portion 202 to the tower 100.

With such an arrangement, when the direction of the upwind incoming flow changes, based on the presence of the tail portion 202, the moment of the upwind incoming flow to the tail portion 202 may be greater than the moment of the upwind incoming flow to the leading edge 201, thereby causing the streamlined body 200 to sway, as shown in FIG. 5-5, thus, the streamlined body 200 is rotated until the leading edge 201 is aligned with the upwind incoming flow, that is, achieving automatic alignment. The leading edge 201 of the streamlined body 200 can always be aligned with the upwind incoming flow to achieve the above objects of changing the attack angle and the aerodynamic configuration, thereby turning timely according to the wind direction to always exert its function of suppressing vortex-induced vibrations.

Obviously, due to the instability of the wind speed and the complexity of the force of the streamlined body 200 in the air itself, the streamlined body 200 may sway constantly during rotation as the wind direction changes, and the streamlined body 200 may also collide with the outer wall of the tower 100 in the front, rear, right and left directions, thereby further disturbing the airflow in the vicinity of the streamlined body 200, suppressing the occurrence of the Karman vortex phenomenon, and suppressing the vortex-induced vibrations.

As shown in FIG. 5-2, the streamlined body 200 is expanded and elongated toward two sides from the leading edge 201 thereof, and then gradually contracted rearwards, and then gradually expanded to form the tail portion 202. That is to say, the two sides of the streamlined body 200 are also streamlined, and the two sides are symmetrically arranged. When the upwind incoming flow flows rearwards after flowing over the leading edge 201, it flows in smooth transition, and is subjected to a certain resistance at the expanded tail portion 202, so as to be accumulated between the contraction segment contracted first and the expansion segment expanded later (at a "waist portion" of the "fish"), to prevent the vortexes formed by the upwind incoming flow from shedding, and suppress the vortex-induced vibrations.

An outer edge of the tail portion 202 of the streamlined body 200 is cambered, and the cambered shape facilitates the reduction of the resistance of the streamlined body 200 to the fluid flowing around, and facilitates the reduction of the resistance subjected by the tail portion when swaying with the lateral wind.

The streamlined body 200 is preferably designed as a symmetrical structure, and the symmetrical centerline is the line connecting the middle of the leading edge 201 to the middle of the tail portion 202. When the streamlined body surrounds the tower 100, the symmetrical centerline is actually in the same direction as the upwind incoming flow. As shown in FIG. 5-2, the fish-shaped streamlined body 200 has a symmetrical structure. The symmetrical structure of the streamlined body 200 facilitates the balance of the streamlined body 200 under the action of the airflow, ensures that the leading edge 201 thereof can be always aligned with the upwind incoming flow.

In describing the structure of the above streamlined body 200, it is mentioned that the structure of the streamlined body 200 or the floatable streamlined body 200 is various, so the shape of the streamlined body 200 is not limited to the "fish shape" in the drawing. For example, when only to achieve change of the attack angle, the two sides of the streamlined body 200 are not required to be streamlined. Moreover, the lower surface of the leading edge 201 inclined downward may just achieve the formation of a negative attack angle without requiring to design the lower surface of the entire streamlined body 200 to be inclined downwards. In FIG. 4, the lower surface of the leading edge 201 of the streamlined body 200 is inclined downward and then slightly raised, and then entirely inclined downward, to change the direction of the airflow, and form downwards a larger negative attack angle (FIG. 8). The streamlined body slightly raised and then inclined downwards here is helpful to gain a floating force.

Figure 16:
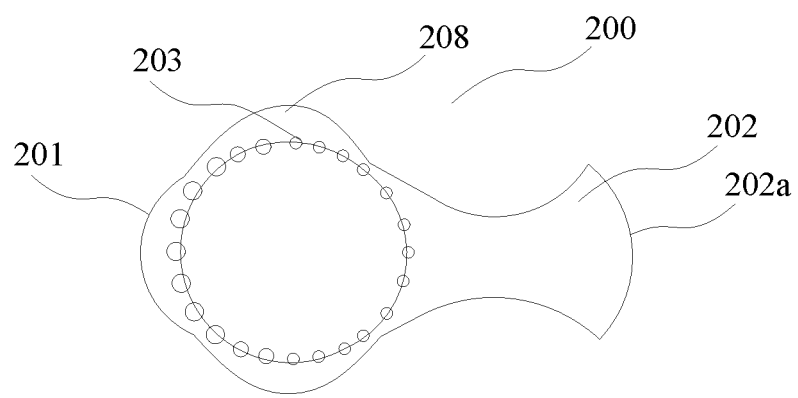
FIG. 16 is a top view of another streamlined body.

In addition, from the point of view that the tail portion 202 follows the wind direction to sway, it is also feasible to provide a protrusion 208 similar to the leading edge 201 on two sides of the streamlined body 200, as shown in FIG. 16, FIG. 16 is a top view of another streamlined body.

The streamlined body 200 is provided with the protrusions 208 on two sides of its structure, which enables the streamlined body 200 to be more quickly in response to the change of the wind direction of the upwind incoming flow, so that the leading edge 201 is quickly and automatically aligned with the upwind incoming flow.

As described above, in the case that the streamlined body 200 is floatable, it can further disrupt the consistence of frequencies of vortex shedding by disturbing the airflow, so as to suppress the vibrations. Thus, for improving the floating performance of the streamlined body 200, the annular streamlined body 200 may have an annular cavity (similar to a swim ring), and gas is filled inside the annular cavity, and the gas has a density less than that of the air. The gas filled here may be, for example, a hydrogen gas, helium gas or the like. Thus, the floating force of the streamlined body 200 here is the sum of the floating force generated by the density difference of the gases and the floating force generated by the streamlined body 200 based on the upwind incoming flow (the speed may generally reach 3 m/s to 4 m/s), such that the streamlined body 200 is easier to float.

Based on the objects of floating and collision, the streamlined body 200 can be entirely made of a material that is lightweight, airtight, and wear resistant. For example, it may be canvas, a polymer material, a flame retardant polymer material, or the like. Good air-tightness can prevent internal air leakage, and prevent rainwater from being adsorbed to increase the weight of the material accordingly. Wear resistance can meet the requirements of collision and swaying, and can also prevent the material from being scratched by objects such as branches in the natural environment.

With continued reference to FIGS. 4, 5-3, and 5-4, the streamlined body 200 has an inner side outer surface 200*b* that faces towards the tower 100, and an outer side outer surface 200*a* that faces away from the tower 100. The inner side outer surface 200*b* is provided with a number of elastic bodies that are capable of squeezing the tower 100. The elastic body here may be a solid body of an elastic material or a chamber, and in the case that it is a chamber, a gas may be sealed in the cavity. In this embodiment, elastic spheres 203 are specifically provided, and a part of the elastic sphere 203 (which may be half or other proportion, in this embodiment, half of the elastic sphere is exposed for illustration) is exposed from the inner side outer surface 200*b* of the streamlined body 200, and may be defined as an exposed portion 203*b*, and the exposed portion 203*b* forms the elastic body. Another portion of the elastic sphere 203 is fixed to the inside of the annular cavity of the streamlined body 200, and may be defined as an internally hidden portion 203*a*.

Figure 17:
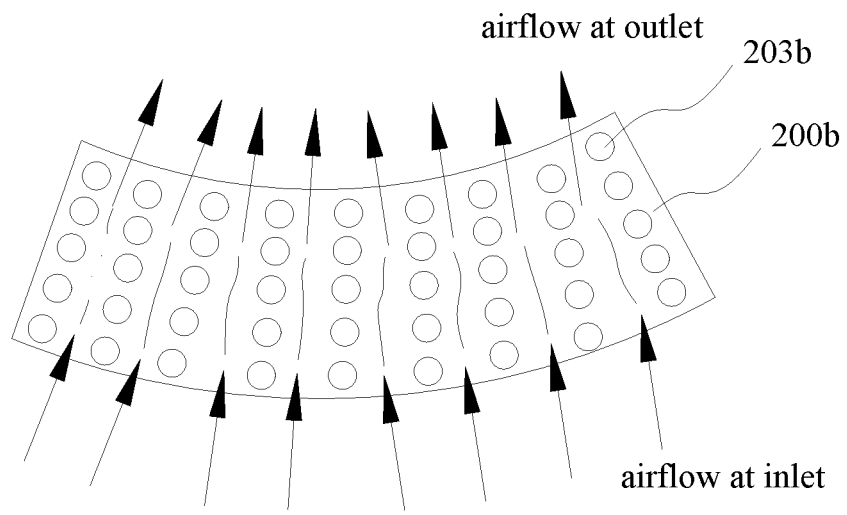
FIG. 17 is a schematic view showing a part of an inner side outer surface of the streamlined body in FIG. 4 in an expanded state, and that elastic spheres here are not squeezed.
Figure 18:
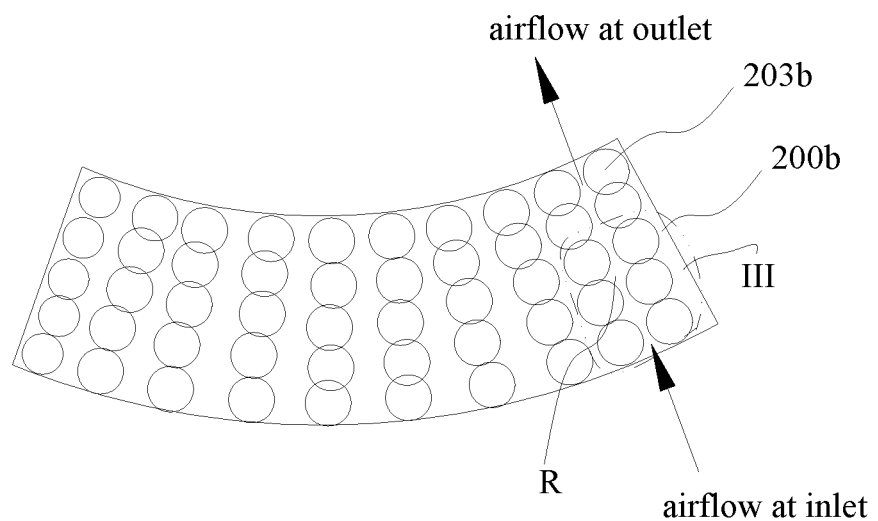
FIG. 18 is a schematic view showing the elastic spheres in FIG. 17 after being squeezed.
Figure 19:
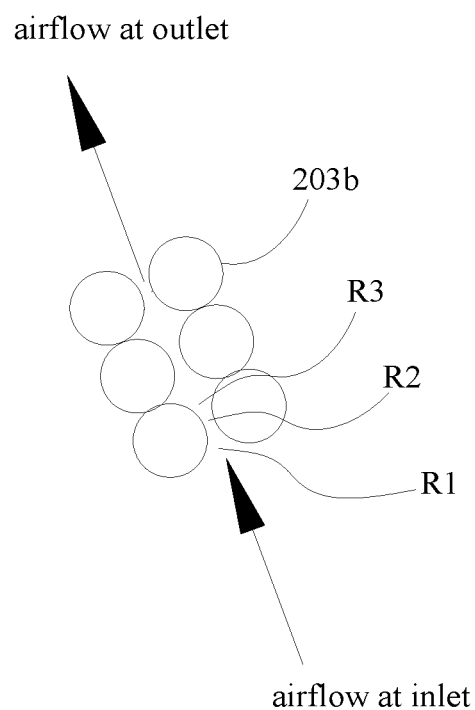
FIG. 19 is a schematic partially enlarged view showing a part III in FIG. 18.

Reference is made to FIGS. 17 to 19, FIG. 17 is a schematic view showing a part of an inner side outer surface 200*b* of the streamlined body 200 in FIG. 4 in an expanded state, and that the elastic spheres 203 here are not squeezed; FIG. 18 is a schematic view showing the elastic spheres 203 in FIG. 17 after being squeezed; and FIG. 19 is a schematic partially enlarged view showing a part III in FIG. 18.

As shown in FIG. 17, the elastic spheres 203 are distributed in entire circumferential and height directions of the inner side outer surface 200*b* of the tower 100, that is, multiple lines of elastic spheres 203 are arranged along the circumferential direction. The elastic spheres 203 include the exposed portions 203*b*, so the elastic spheres are arranged such that a flow channel R can be formed between adjacent two lines of exposed portions 203*b*, that is, the elastic spheres are preferably arranged regularly to form a substantially straight flow channel R to facilitate the passage of airflow.

As shown in FIG. 5-4, when the upwind incoming flow flows over the streamlined body 200, a part of the airflow flows along the leading edge 201 (the region G-A-B shown in the figure), and then slopes downward, passing through the region C-D-E-F, and a portion of the airflow flows around to the rear of the tower 100, still a portion of the airflow may be suctioned from bottom to top into an annular gap S (understood with reference to FIG. 5-1) between the streamlined body 200 and the outer wall of the tower 100, and flows upwards from the gap S, i.e., the airflow H shown in the figure. The airflow H may flow along a convergent-divergent flow channel R shown in FIGS. 17 to 19. As shown in FIG. 19, a flow channel unit is formed between exposed portions 203*b* of six elastic spheres 203. When the upwind incoming flow acts on the streamlined body 200, the portion, at the location corresponding to the action force, of the streamlined body 200 may fit against the outer wall of the tower 100, and further be pressed against the outer wall of the tower 100, and then the convergent-divergent flow channel R between the exposed portions 203*b* will be transformed from the state in FIG. 17 to the state in FIG. 18, and the flow channel is narrowed.

It may be understood that when the exposed portions 203*b* of the elastic spheres 203 fit against the outer wall of the tower 100 and are squeezed, the gap S corresponding to the position is actually divided into multiple lines of convergent-divergent flow channels R by the multiple lines of exposed portions 203*b* here.

As shown in FIG. 19, in the circumferential direction, the gap between the exposed portions 203*b* of adjacent two elastic spheres 203 is narrowed, and the air in the gap is squeezed, and the convergent-divergent flow channel R formed here is like a an internal flow channel of a convergent-divergent jet pipe. As shown in FIG. 19, starting from an inlet, the airflow flows through sequentially a gradually convergent flow channel R1 (the flow channel is narrowed here), a throat portion R2 (the flow channel has a substantially constant width here), and a gradually divergent flow channel R3 (the flow channel is widened here), and then flows through sequentially the gradually convergent flow channel R1, the throat portion R2, and the gradually divergent flow channel R3, that is, the convergent-divergent flow channel R is defined as including the convergent and divergent flow channel segments. The structure can narrow the original flow channel by a squeezing process, to elastically compress and adiabatically compress the gas in the process of narrowing, to accelerate the airflow. In the case that the streamlined body 200 has a long tail portion 202, the airflow in each direction of the circumference of the streamlined body 200 is actually accelerated during the sway, which is not limited to the position of the leading edge 201.

The airflow H pressed out of the convergent-divergent flow channel R has a function of "blowing" (i.e., the convergent-divergent flow channel R is extended up and down) to the upper boundary layer of the tower 100, thereby disturbing the upper airflow flowing around the wall of the tower 100, disrupting the boundary layer here and suppressing and disrupting the formation of the Karman vortex street, suppressing the occurrence of lateral vibrations of the tower 100, that is, suppressing vortex-induced vibrations. Here, the intention of the present application is to make full use of the natural force, to achieve the best flow-disturbing and disrupting effect under the premise of environmental protection, suppress the occurrence of the Karman vortex phenomenon, and hinder the occurrence of vortex-induced vibrations or reduce the vibrations.

As described above, the purpose of providing the elastic spheres 203 here is to squeeze the elastic spheres 203 against the outer wall of the tower 100 to thereby forming the convergent-divergent flow channel, to accelerate the airflow entering the gap between the outer wall of the tower 100 and the streamlined body 200, so the elastic spheres 203 can be filled with gas, however, for ensuring the safety during the pressing, it is possible to fill a gas that is safer and less explosive, such as helium.

In addition, a complete elastic sphere 203 is provided herein, which is only partially exposed, and includes the internally hidden portion 203a hidden inside the streamlined body 200. Each of the elastic spheres 203 is independent, thus when being squeezed, the airflow in the exposed portion 203b moves to the internally hidden portion 203a, to increase the moving space of the single sphere 203, for constructing the convergent-divergent flow channel, and the convergent-divergent flow channel accelerates flowing of the airflow by the energy generated during the collision. Of course, it is also feasible to form several hemispheres or partial spheres of other proportions on the inner side outer surface 200b of the streamlined body 200. Further, the formation of the elastic body is not limited to forming the elastic sphere 203, and the shape of the spheres is for facilitating the formation of the convergent-divergent flow channel during the squeezing, so the elastic body may be an ellipsoid, a triangular body or the like. In fact, when the elastic bodies are not squeezed, the convergent-divergent flow channel R is also formed between adjacent two lines of elastic bodies 203, just the convergent-divergent flow channel R formed in this case has a large width, and further has a gap from the outer wall of the tower 100, and is an open flow channel, and the accelerating effect achieved by which is not so significant as that achieved by the flow channel formed in the squeezing state.

Reference is further made to FIG. 5-1, at the leading edge 201 of the streamlined body 200, the density of the elastic spheres 203 is less than the density of the elastic spheres 203 at the rest positions. The leading edge 201 of the streamlined body 200 faces toward the upwind incoming flow, so the elastic spheres 203 are subjected to a larger squeezing force and therefore have a larger deformation, so the density can be set slightly smaller, and the elastic spheres at the rest positions are subjected to a relatively small force, and therefore are less deformed, and the density of the elastic spheres here can be set slightly large for forming a relatively appropriate convergent-divergent flow channel R.

With continued reference to FIG. 5-4, it can be seen that the central through hole 207 of the streamlined body 200 has a gradually decreased cross-sectional dimension from bottom to top. Then, when the upwind incoming flow acts on the leading edge 201 of the streamlined body 200 to squeeze, a narrowed channel R' is formed between the tail portion 202 side and the outer wall of the tower 100, for squeezing the airflow flowing through the gap. Similar to the principle of the convergent-divergent flow channel R described above, the narrowed channel R' can also achieve the object of accelerating the airflow here to allow it to disturb the boundary layer here of the tower 100, so as to suppress the vortex-induced vibrations. Of course, in addition to the region of the tail portion 202, the narrowed channel R' may be formed between the outer wall of the tower 100 and all the rest positions rather than the squeezed position of the streamlined body 200 (only the leading edge 201 and the tail portion 202 are shown in FIG. 5-4). That is, when the upwind incoming flow acts on the streamlined body 200, both the convergent-divergent flow channel R and the narrowed channel R' act simultaneously, to "blow" towards the upper airflow to disrupt the bypass flow in the boundary layer.

Figure 20:
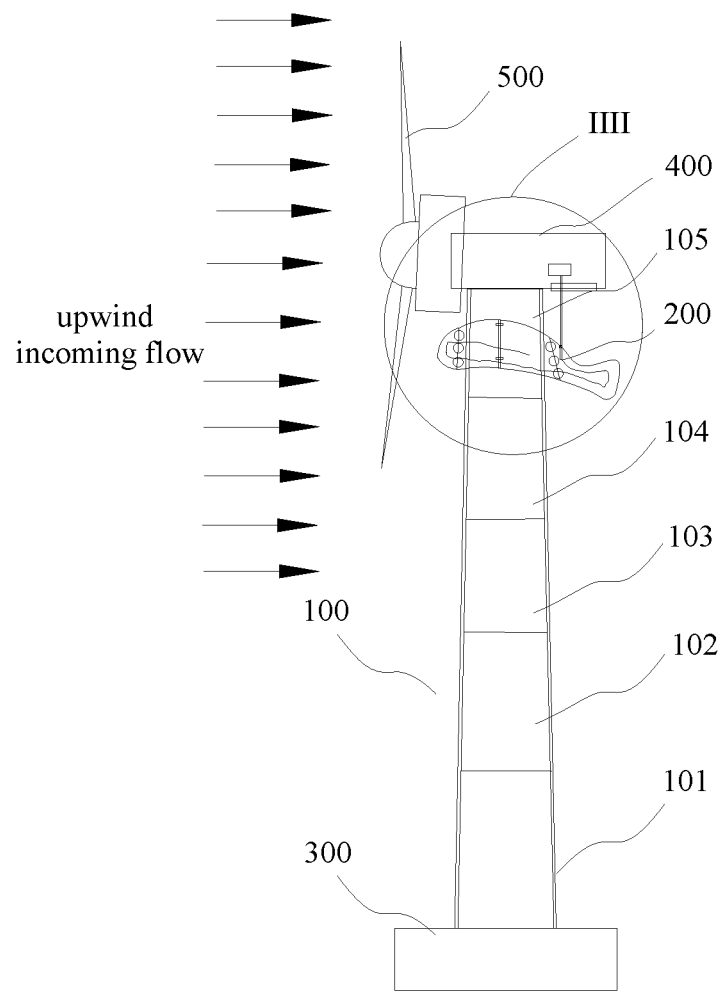
FIG. 20 is a schematic view showing a tower with a recovery device for recovering the streamlined body.
Figure 21:
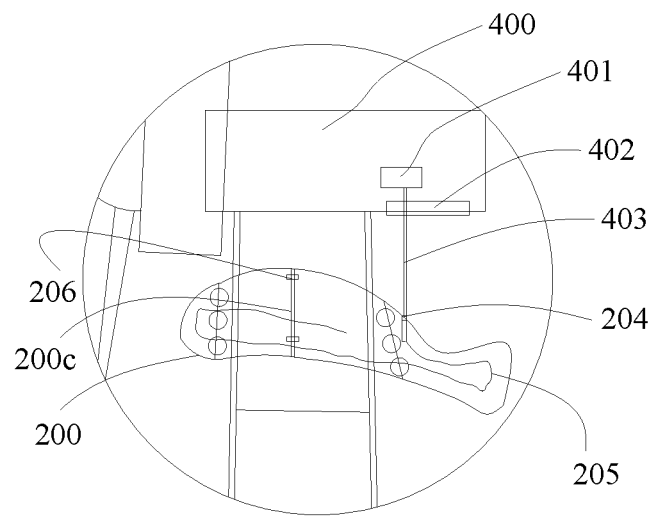
FIG. 21 is a schematic partially enlarged view of a part IIII in FIG. 20.
Figure 22:
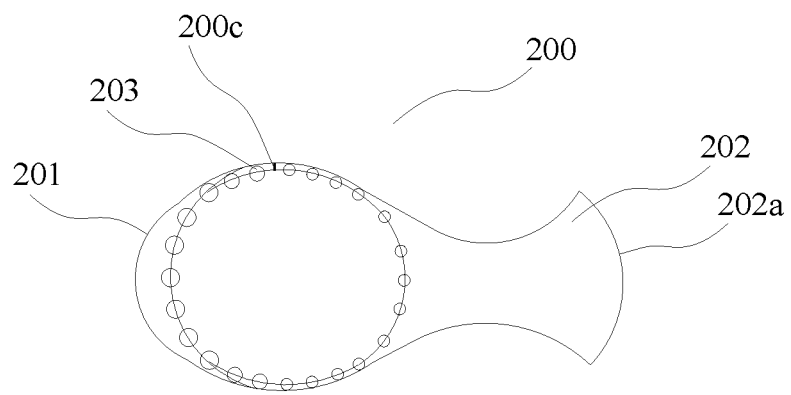
FIG. 22 is a top view of the streamlined body in FIG. 20.

Reference is made to FIGS. 20 to 22. FIG. 20 is a schematic view showing a tower 100 with a recovery device for recovering the streamlined body 200; and FIG. 21 is a schematic partially enlarged view of a part IIII in FIG. 20; and FIG. 22 is a top view of the streamlined body 200 in FIG. 20.

The streamlined body 200 in this embodiment has abutment surfaces 200c, and can form a complete annular shape after the abutment surfaces 200c are butt-jointed. As shown in FIG. 22, at the position of the abutment surfaces 200c, the streamlined body 200 can be locked into a complete annular shape or unlocked into an opened annular shape. The arrangement of the abutment surfaces 200c facilitates the operation of sleeving the streamlined body 200 on the tower 100, and also facilitates recovering.

The annular cavity of the streamlined body 200 can be filled with a gas, and a valve core 204 may be provided to communicate the internal pipeline 205 of the streamlined body 200, thereby achieving inflation and deflation.

As shown in FIG. 21, the nacelle 400 is installed on the top of the tower 100, and an impeller 500 is mounted to the outside of the nacelle 400. A gas collection device 401 is further provided in the nacelle 400, and a recovery pipe 403 is further equipped. A recovery port 402 is provided at the bottom of the nacelle 400, and the recovery pipe 403 passes through the recovery port 402. One end of the recovery pipe 403 is connected to the valve core 204 of the streamlined body 200 outside the nacelle 400, and another end thereof is connected to the gas collection device 401 inside the nacelle 400, and the gas in the streamlined body 200 can be recovered into the air collection device 401. That is, when the streamlined body 200 is not required for using, the recovery pipe 403 can be inserted into the valve core 204, to discharge the gas pressed into the annular cavity of the streamlined body 200, such that the streamlined body 200 can be hoisted and recovered from the recovery port 402 of the nacelle 400 to the inside of the nacelle 400.

As described above, in order to increase the floating force, the streamlined body 200 can be filled with a gas having a density lower than a density of air, such as hydrogen gas or helium gas, and the gas can be reused after being recovered, to save resources and reduce costs. The material of the streamlined body 200 can be a foldable material, and can be folded for easy storage when the gas is discharged and the streamlined body is to be recovered, to reduce the space occupied.

The foregoing streamlined body 200 has the abutment surfaces 200*c*, and in this case, a wireless electronic lock 206 may be further equipped. The abutment surfaces 200*c* are locked and engaged by a wireless electronic lock 206 to form a complete annular shape. Moreover, a remote controller is provided in the nacelle 400, to wirelessly control the electronic lock. Thus, the wireless electronic lock 206 can be remotely controlled to be unlocked in the nacelle 400 during recovery, so that the streamlined body 200 can be removed from the tower 100 to be hoisted and recovered into the nacelle 400. Of course, the remote controller may also be arranged on the ground or at the bottom in the tower 100 for easier operation and control by the operator.

The foregoing gas collection device 401 and the remote controller and the like are all arranged in the nacelle 400. Since vibration suppression is in high demand for the upper part of the tower 100, the streamlined body 200 is preferably designed to float to the top of the tower 100, thus it is convenient for practical operation of recovering the streamlined body 200 into the nacelle 400 at the top of the tower.

When surrounding the tower 100 with the above streamlined body 200, the streamlined body 200 can be used in the hoisting stage of the tower 100.

Figure 23:
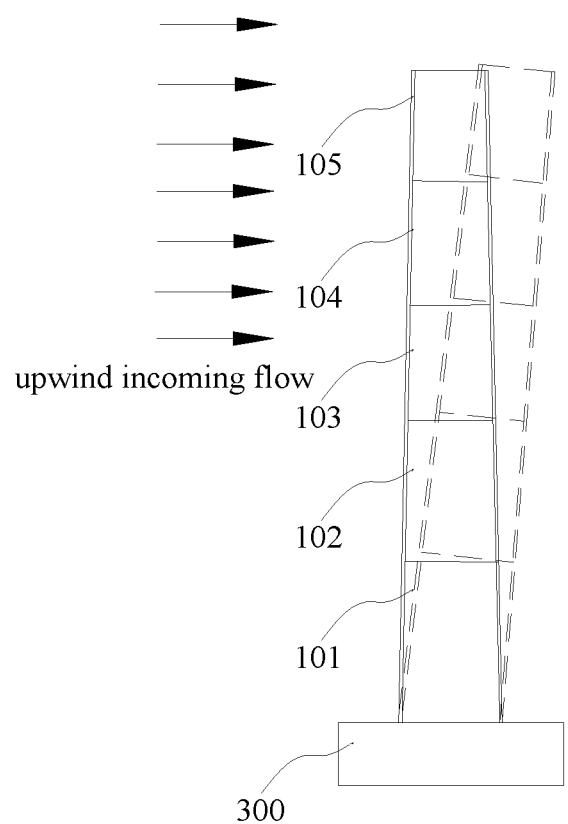
FIG. 23 is a schematic view showing that the tower undergoes a pitching vibration.
Figure 24:
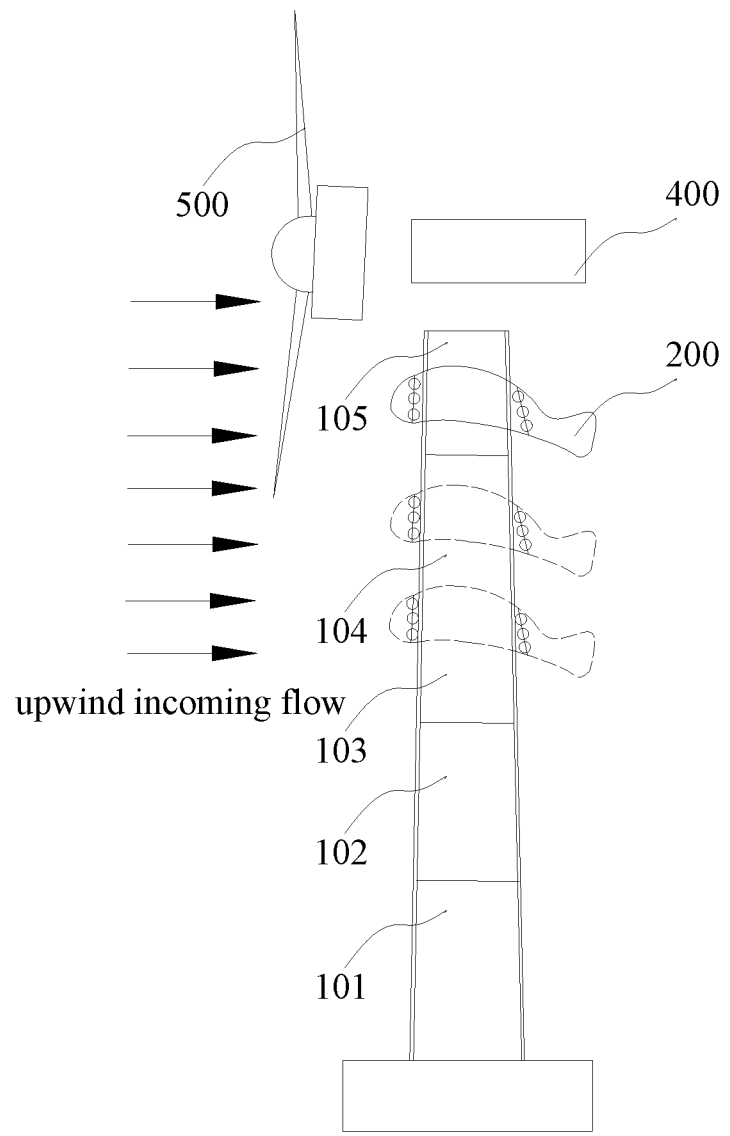
FIG. 24 is a schematic view showing the process that the nacelle is installed to the tower for vibrations of the tower are suppressed after the tower is provided with the streamlined body.

As shown in FIG. 23, FIG. 23 is a schematic view showing that the tower 100 undergoes a pitching vibration; and FIG. 24 is a schematic view showing the process that the nacelle 400 is mounted to the tower for vibrations of the tower are suppressed after the tower is provided with the streamlined body 200.

When the streamlined body is not provided, as in the description of the background technology, the tower 100 may undergo vortex-induced vibrations. FIG. 23 shows that the whole tower 200 undergoes a pitching vibration under the action of the upwind incoming flow after the hoisting of the entire tower 200 is finished, and the bolts at the location of the ground foundation 300 will be broken. In practice, in the process of hoisting of the tower 100, an installed tower segment will also vibrate, resulting in difficulty in installing a tower segment above the installed tower segment and installing the nacelle 400 and the impeller 500 above the tower 100 after the hoisting of the tower 100 is finished.

As shown in FIG. 24, after the streamlined body 200 is provided, the vibrations of the tower 100 are suppressed, thus avoiding vibrations or reducing the vibration amplitude, and avoiding damage to the connecting bolts or other fasteners, thereby ensuring the reliability of the installation, reducing the adverse effects of weather on construction, and significantly shortening the construction period, reducing construction costs, and also improving construction safety.

Specifically, during construction, the streamlined body 200 may be placed to surround the first tower segment 101 just at the beginning of hoisting the first tower segment 101. However, as described previously, the disrupting force caused by the vibrations is mainly exhibited in the upper part of the tower at a relatively high position, therefore with regards to FIG. 24, in the case of hoisting the tower in segments, placing the streamlined body 200 to surround the tower may be started just from hoisting the third tower segment 103 or the fourth tower segment 104. In the case that the tower is surrounded by a streamlined body 200 having a float function, the streamlined body 200 can float to a higher tower segment automatically, to suppress vibrations continuously. After hoisting of all of the tower segments is finished, the streamlined body 200 is located at the highest fifth tower segment 105 at the top. In the state that vibrations are suppressed, the nacelle 400 and the impeller 500 are installed, and after the installation finishes, the streamlined body 200 may be removed and recovered into the nacelle 400 by the recovering method described above for reuse.

It should be noted that the streamlined body 200 may not be recovered after the hoisting of the tower 100 is finished, and may continue to be used, to keep playing the vibration suppression role for the completely installed tower 100. Of course, it is also feasible to decide whether or not to perform the recovering operation depending on practical requirements.

In summary, the present application specially focuses on destructive phenomenon of resonances and Karman vortex street possibly occurred after a tower is coupled with airflow even started from the hoisting of the tower 100 in the case that the installation process of the wind power generator set is in airflow. Therefore, a protection system is required to be built up, that is, the streamlined body 200 according to this embodiment. In the process of constructing a wind farm, it is prepared to install the streamlined bodies 200 to the circumferences of the several upper segments of the tower 100, and the streamlined bodies 200 disrupt the flow field by means of the natural force airflow around the tower 100, such that the protection system changes the flow field on the surface of the tower 100 or the flow field in the vicinity of the surface of the tower 100, prevents the vortex street phenomenon of the tower 100 from occurring, prevents the magnification of the response to the vortex-induced vibrations of the tower 100, and suppresses the vortex-induced vibrations of the tower 100.

It should be noted that the above description is made by taking the tower as an example. It can be appreciated that the streamlined body described above may be used for vibration suppression in similar enclosures, For example, the tower may also be a TV tower or an anemometer tower, etc. Thus, the streamlined body can be used or detached depending on practical requirements both in installation and after the installation.

The above described embodiments are only preferred embodiments of the present application, and it should be noted that for the person skilled in the art, several improvements and modifications can be made without departing from the principle of the present application, and these improvements and modifications should also be deemed to fall into the scope of protection of the present application.

The invention claimed is:

1. A streamlined body for suppressing vibrations of an enclosure surrounded by the streamlined body, the streamlined body comprising:
a streamlined leading edge facing towards an upwind incoming flow to form the upwind incoming flow into a positive attack angle or a negative attack angle,
wherein the streamlined body is configured to rise under an action of the upwind incoming flow.

2. The streamlined body for suppressing vibrations of the enclosure according to claim 1, wherein the streamlined body has an annular shape, a central through hole of the streamlined body has a lateral dimension, and the lateral dimension meets the following requirement: when the streamlined body is at the top of the enclosure, a gap between an inner wall of the central through hole of the streamlined body and the enclosure has a predetermined size for disrupting a raising force generated by the upwind incoming flow and achieving self-balancing of the streamlined body.

3. The streamlined body for suppressing vibrations of the enclosure according to claim 1, wherein the streamlined body has a closed annular shape.

4. The streamlined body for suppressing vibrations of the enclosure according to claim 3, wherein the streamlined body further comprises a tail portion opposite to the leading edge, and a distance from the leading edge to the enclosure is less than a distance from the tail portion to the enclosure.

5. The streamlined body for suppressing vibrations of the enclosure according to claim 4, wherein the leading edge of the streamlined body is gradually expanded to both sides, then gradually contracted rearwards, and then gradually expanded to form the tail portion.

6. The streamlined body for suppressing vibrations of the enclosure according to claim 5, wherein an outer edge of the tail portion is cambered.

7. The streamlined body for suppressing vibrations of the enclosure according to claim 1, wherein the streamlined body has an annular shape and has an annular cavity, a gas is filled in the annular cavity, and the gas has a density less than a density of air.

8. The streamlined body for suppressing vibrations of the enclosure according to claim 1, wherein an outer surface of an inner side of the streamlined body facing towards the enclosure is provided with a plurality of elastic bodies configured to squeeze the enclosure under the action of the upwind incoming flow, and a convergent-divergent flow channel of air flow is formed among the plurality of elastic bodies when the plurality of elastic bodies squeeze the enclosure.

9. The streamlined body for suppressing vibrations of the enclosure according to claim 8, wherein the streamlined body is provided with elastic spheres, and each of the elastic spheres has a portion exposed from the streamlined body to form an elastic body and another portion fixed in the streamlined body.

10. The streamlined body for suppressing vibrations of the enclosure according to claim 9, wherein the elastic spheres are distributed along a circumferential direction and a height direction of the outer surface of the inner side of the streamlined body, and a first part of the elastic spheres on a side facing towards the upwind incoming flow has a distribution density less than that of a second part of the elastic spheres at other positions.

11. The streamlined body for suppressing vibrations of the enclosure according to claim 8, wherein the streamlined body has an annular shape, and a central through hole of the streamlined body has a gradually decreased lateral dimension from bottom to top.

12. The streamlined body for suppressing vibrations of the enclosure according to claim 1, wherein the streamlined body has abutment surfaces, and has a complete annular shape after the abutment surfaces are butt-jointed and locked.

13. The streamlined body for suppressing vibrations of the enclosure according to claim 1, wherein the streamlined body is made of a material having airtightness and wear resistance, the streamlined body further comprises a tail portion opposite to the leading edge, the streamlined body has a symmetrical structure, and a symmetrical center line of the symmetrical structure connects a middle of the leading edge to a middle of the tail portion.

14. A streamlined apparatus for suppressing vibrations of an enclosure, comprising:
one or more tethers; and
a streamlined body surrounding the enclosure and connected to the one or more tethers, the streamlined bod comprising a streamlined leading edge, the streamlined leading edge facing towards an upwind incoming flow to form the upwind incoming flow into a positive attack angle or a negative attack angle,
wherein the streamlined body is configured to rise under an action of the upwind incoming flow.

15. The streamlined apparatus for suppressing vibrations of the enclosure according to claim 14, a wherein each tether has one end fixed to the enclosure or a ground and another end connected to the streamlined body.

16. The streamlined apparatus for suppressing vibrations of the enclosure according to claim 15, wherein:
at least one segment of each tether is an elastic segment; or
the one or more tethers comprises a first tether and a second tether, and the leading edge and a tail portion of the streamlined body are connected to the first tether and the second tether, respectively.

17. The streamlined apparatus for suppressing vibrations of the enclosure according to claim 14, wherein:
the streamlined body has an annular shape and has an annular cavity, and a gas is filled inside the cavity; and
the streamlined apparatus further comprises a recovery pipe and a gas collection device, the recovery pipe having one end connected to the streamlined body and another end connected to the gas collection device for recycling the gas in the streamlined body to the gas collection device.

18. The streamlined apparatus for suppressing vibrations of the enclosure according to claim 17, wherein the enclosure is a tower of a wind power generator set, a television tower or an anemometer tower, and the gas collection device is arranged within a nacelle at the top of the enclosure.

19. The streamlined apparatus for suppressing vibrations of the enclosure according to claim 17, wherein:
the streamlined body has abutment surfaces, and has a complete annular shape after the abutment surfaces are butt-jointed and locked;
the streamlined apparatus further comprises a wireless electronic lock, and the abutment surfaces are locked by the wireless electronic lock; and
the streamlined apparatus further comprises a remote controller for wirelessly controlling the wireless electronic lock.

20. The streamlined apparatus for suppressing vibrations of the enclosure according to claim 18, wherein the nacelle comprises a recovery port, and the streamlined body is hoistable into the nacelle via the recovery port.

21. A method for hoisting a tower, wherein the tower comprises a plurality of tower segments, and the tower is hoisted in segments during an installation process of the tower, the method comprising:
surrounding a tower segment from the plurality of tower segments with a streamlined body in a streamlined apparatus during the installation process of the tower, wherein the streamlined apparatus comprises:
the streamlined body comprising a streamlined leading edge facing towards an upwind incoming flow to form the upwind incoming flow into a positive attack angle or a negative attack angle, wherein the streamlined body is configured to rise under an action of the upwind incoming flow.

22. The method for hoisting the tower according to claim 21, wherein the tower segment is surrounded with the streamlined body when one or more other tower segments corresponding to an upper part of the tower are installed.

23. The method for hoisting the tower according to claim 21, further comprising removing the streamlined body from the tower after the installation process of the tower is finished and a nacelle is installed on the tower.

* * * * *